(12) United States Patent
Colby et al.

(10) Patent No.: US 10,364,374 B2
(45) Date of Patent: *Jul. 30, 2019

(54) DRY APPLY PROTECTIVE METHODS

(71) Applicant: ZAGG Intellectual Property Holding Co., Inc., Midvale, UT (US)

(72) Inventors: Jim A. Colby, Highland, UT (US); Gregory E. Booth, Hilliard, OH (US); Jonathan B. Benson, Herriman, UT (US); Derek M. Smith, Alpine, UT (US); James McGuire, Westerville, OH (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,172

(22) Filed: Oct. 3, 2017

(65) Prior Publication Data

US 2018/0022963 A1 Jan. 25, 2018

Related U.S. Application Data

(63) Continuation of application No. 13/865,175, filed on Apr. 17, 2013, now Pat. No. 9,777,195, and a
(Continued)

(51) Int. Cl.
*B29C 65/48* (2006.01)
*B32B 37/12* (2006.01)
(Continued)

(52) U.S. Cl.
CPC ............ *C09J 5/00* (2013.01); *B29C 63/0047* (2013.01); *B29C 63/02* (2013.01); *B32B 3/02* (2013.01);
(Continued)

(58) Field of Classification Search
USPC ................................................ 156/249, 289
See application file for complete search history.

(56) References Cited

U.S. PATENT DOCUMENTS

| 3,971,691 A | 7/1976 | Cairns |
| 3,987,569 A | 10/1976 | Chase |

(Continued)

FOREIGN PATENT DOCUMENTS

| JP | 2002-297041 A | 10/2002 |
| KR | 1020050093046 A | 9/2005 |

(Continued)

OTHER PUBLICATIONS

Petrie, E.M., "Selecting and Adhesive—Like Selecting a Marriage Partner," SpecialChem, accessed at http://www.specialchem4adhesives.com/home/editorial/aspx?id=353 (May 28, 2003).

(Continued)

*Primary Examiner* — Sing P Chan
(74) *Attorney, Agent, or Firm* — Durham Jones & Pinegar, P.C., Intellectual Property Law Group

(57) ABSTRACT

A system for protecting a surface of a substrate includes a protective film, which is configured to be applied and secured to the surface, as well as a backing on an adherent surface of the protective film and an application tape over an exterior surface of the protective film. Protruding features, such as tabs, adjacent to different peripheral edges of the protective film may enable removal of the backing and the application tape from the protective film, and may include features that indicate the order in which each protruding feature is to be grasped to peel its corresponding element away from the protective film. Methods of using such a system are also disclosed.

42 Claims, 8 Drawing Sheets

Related U.S. Application Data continuation-in-part of application No. 13/166,745, filed on Jun. 22, 2011.

(60) Provisional application No. 61/625,550, filed on Apr. 17, 2012, provisional application No. 61/357,972, filed on Jun. 23, 2010, provisional application No. 61/357,427, filed on Jun. 22, 2010.

(51) Int. Cl.

| | | |
|---|---|---|
| *B32B 37/26* | (2006.01) | |
| *B32B 38/10* | (2006.01) | |
| *B32B 43/00* | (2006.01) | |
| *C09J 5/00* | (2006.01) | |
| *B32B 27/08* | (2006.01) | |
| *B29C 63/00* | (2006.01) | |
| *B29C 63/02* | (2006.01) | |
| *B32B 7/06* | (2019.01) | |
| *B32B 7/12* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *B32B 3/02* | (2006.01) | |
| *C09J 7/29* | (2018.01) | |
| *G06F 1/16* | (2006.01) | |
| *H04M 1/18* | (2006.01) | |
| *H04M 1/02* | (2006.01) | |
| *B29L 31/34* | (2006.01) | |

(52) U.S. Cl.

CPC .................. *B32B 7/06* (2013.01); *B32B 7/12* (2013.01); *B32B 27/08* (2013.01); *B32B 27/283* (2013.01); *B32B 27/304* (2013.01); *B32B 27/306* (2013.01); *B32B 27/308* (2013.01); *B32B 27/32* (2013.01); *B32B 27/36* (2013.01); *B32B 27/40* (2013.01); *C09J 7/29* (2018.01); *B29C 2063/027* (2013.01); *B29L 2031/3437* (2013.01); *B29L 2031/3475* (2013.01); *B32B 2307/41* (2013.01); *B32B 2307/412* (2013.01); *B32B 2307/414* (2013.01); *B32B 2307/518* (2013.01); *C09J 2201/162* (2013.01); *C09J 2475/006* (2013.01); *G06F 1/1626* (2013.01); *G06F 1/1656* (2013.01); *H04M 1/0266* (2013.01); *H04M 1/18* (2013.01); *H04M 1/185* (2013.01); *Y10T 428/1471* (2015.01)

(56) References Cited

U.S. PATENT DOCUMENTS

| | | |
|---|---|---|
| 4,026,485 A | 5/1977 | Ambrose |
| 4,119,332 A | 10/1978 | Merrill |
| 4,709,695 A | 12/1987 | Kohn et al. |
| RE33,353 E | 9/1990 | Heinecke |
| 5,419,666 A | 5/1995 | Best |
| 5,498,455 A | 3/1996 | Roberts |
| 5,520,629 A | 5/1996 | Heinecke et al. |
| 5,888,335 A | 3/1999 | Kobe et al. |
| 5,951,054 A | 9/1999 | Hagen et al. |
| 6,008,429 A | 12/1999 | Ritger |
| 6,129,929 A | 10/2000 | Wick |
| 6,159,497 A | 12/2000 | LaPrade et al. |
| 6,613,411 B2 | 9/2003 | Kollaja et al. |
| 6,700,033 B1 | 3/2004 | Marcussen et al. |
| 6,733,863 B1 | 5/2004 | Mizuno et al. |
| 6,758,000 B2 | 7/2004 | Sandt et al. |
| D578,164 S | 10/2008 | Ingle |
| D658,164 S | 4/2012 | Chan |
| 8,333,408 B2 | 12/2012 | Flynn et al. |
| 8,594,755 B1 | 11/2013 | Tages et al. |
| 8,640,759 B2 | 2/2014 | Chen |
| 8,655,481 B2 | 2/2014 | Sheu |
| D708,804 S | 7/2014 | Piro |
| 8,923,937 B2 | 12/2014 | Tages et al. |
| D727,330 S | 4/2015 | Reaux |
| D734,311 S | 7/2015 | Takamoto et al. |
| 9,120,954 B2 | 9/2015 | Feller |
| 9,192,086 B2 | 11/2015 | Hsu et al. |
| 9,248,634 B2 | 2/2016 | Cohen et al. |
| 9,777,195 B2 * | 10/2017 | Colby .................. C09J 5/00 |
| 9,918,418 B2 | 3/2018 | Chou |
| 2001/0053648 A1 | 12/2001 | Furukawa et al. |
| 2003/0082327 A1 | 5/2003 | Pearson et al. |
| 2004/0137249 A1 | 7/2004 | Kamiyama |
| 2004/0170817 A1 | 9/2004 | Fox et al. |
| 2004/0246386 A1 | 12/2004 | Thomas et al. |
| 2005/0087977 A1 | 4/2005 | Crum |
| 2005/0116334 A1 | 6/2005 | Buehler |
| 2005/0168697 A1 | 8/2005 | Bruzzone et al. |
| 2006/0062953 A1 | 3/2006 | Trigg et al. |
| 2006/0186001 A1 | 8/2006 | Anderson et al. |
| 2006/0262405 A1 | 11/2006 | Brumwell |
| 2008/0099152 A1 | 5/2008 | Nakamura |
| 2009/0075006 A1 | 3/2009 | Lynam et al. |
| 2009/0186181 A1 | 7/2009 | Mase |
| 2009/0186198 A1 | 7/2009 | McGuire, Jr. |
| 2009/0301907 A1 | 12/2009 | Mason |
| 2009/0313902 A1 | 12/2009 | Brisbois et al. |
| 2010/0092713 A1 | 4/2010 | Bullard et al. |
| 2010/0098942 A1 | 4/2010 | Stachnik et al. |
| 2010/0264566 A1 | 10/2010 | Moore et al. |
| 2011/0267793 A1 | 11/2011 | Cohen et al. |
| 2011/0293870 A1 | 12/2011 | Lin et al. |
| 2012/0008269 A1 | 1/2012 | Gengler |
| 2012/0057287 A1 | 3/2012 | Chaves et al. |
| 2012/0064318 A1 | 3/2012 | Keite-Telgenbascher et al. |
| 2012/0087072 A1 | 4/2012 | McGuire et al. |
| 2013/0295310 A1 | 11/2013 | Tages et al. |
| 2013/0296004 A1 | 11/2013 | Tages et al. |
| 2014/0130971 A1 | 5/2014 | Wu et al. |
| 2014/0139991 A1 | 5/2014 | Gengler |
| 2014/0230988 A1 | 8/2014 | Chou |
| 2015/0169089 A1 | 6/2015 | Dixon et al. |
| 2015/0246514 A1 | 9/2015 | LaColla et al. |
| 2015/0273786 A1 | 10/2015 | Ozeki |
| 2015/0370288 A1 | 12/2015 | Dinesh |
| 2018/0117874 A1 | 5/2018 | Rothbauer et al. |
| 2018/0350641 A1 | 12/2018 | Nakamura et al. |

FOREIGN PATENT DOCUMENTS

| | | | |
|---|---|---|---|
| KR | 1020060022825 A | | 3/2006 |
| KR | 1020060022952 A | | 3/2006 |
| KR | 1020060094268 A | | 8/2006 |
| WO | 2001052223 A2 | | 7/2001 |

OTHER PUBLICATIONS

Elcometer Instruments Ltd., Operating Instructions (2006).

United States Patent and Trademark Office as the International Searching Authority, International Search Report and Written Opinion, dated Jan. 11, 2012, in international application No. PCT/US2011/041525.

Korean Intellectual Property Office as the International Searching Authority, International Search Report and Written Opinion, dated Apr. 12, 2012, in international application No. PCT/US2011/050216.

* cited by examiner

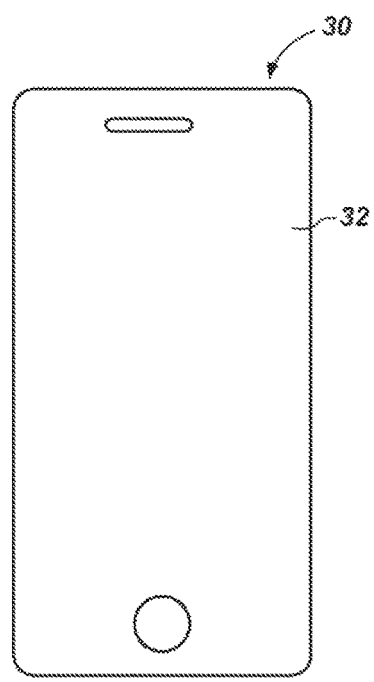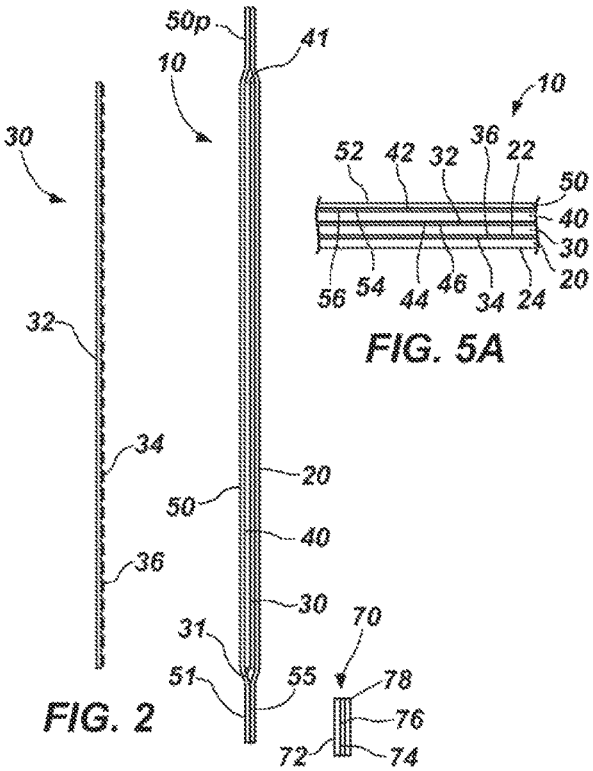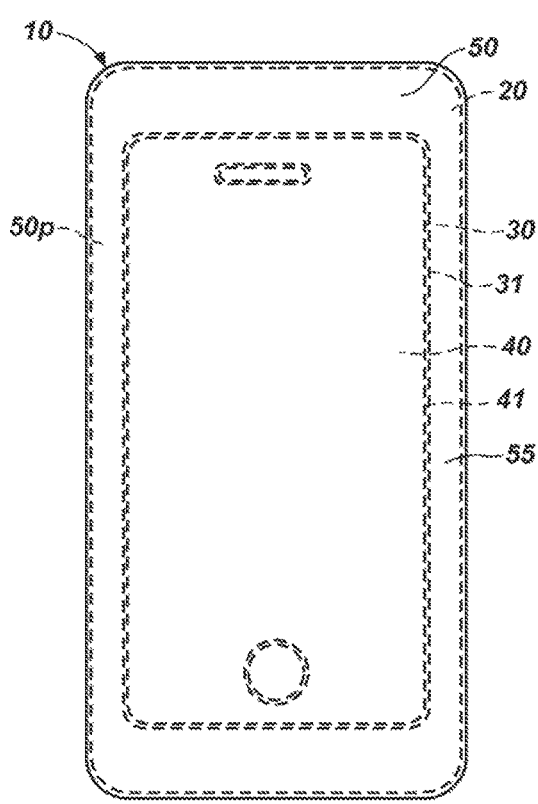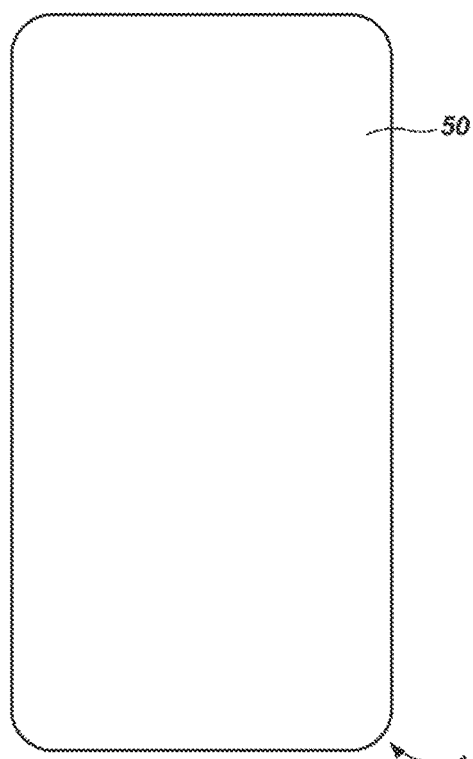

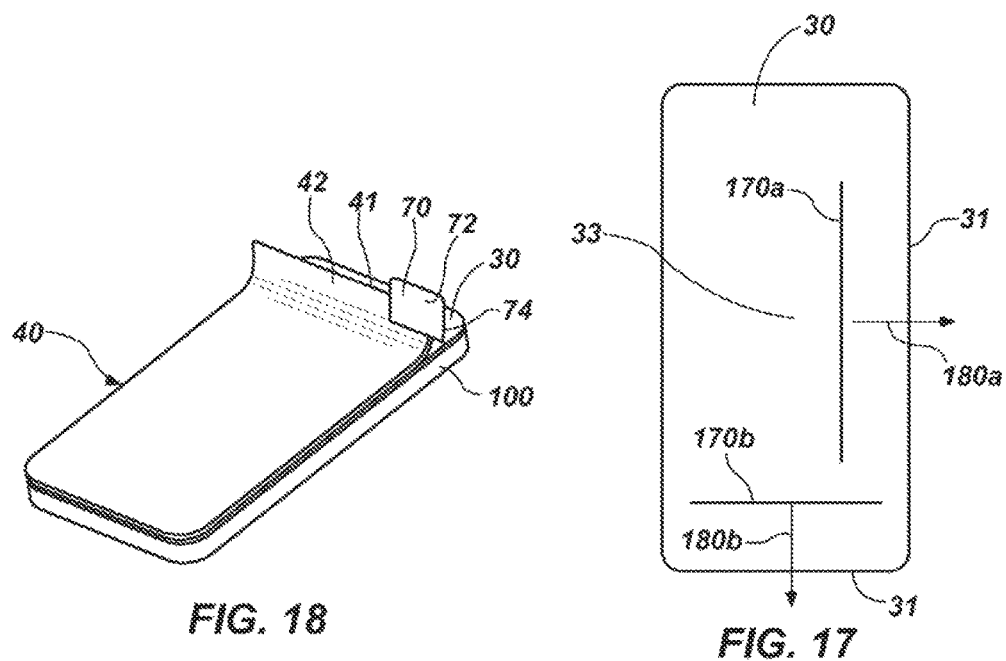
FIG. 18
FIG. 17
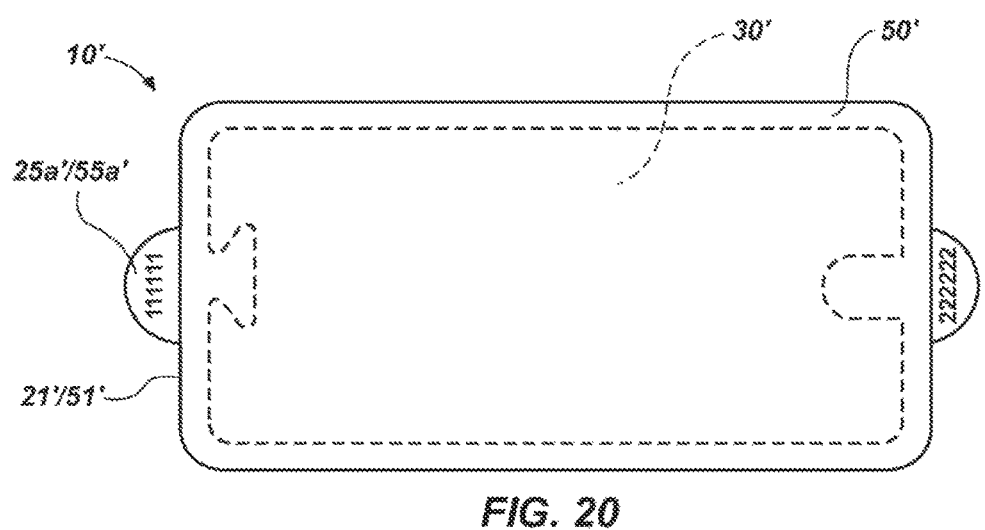
FIG. 20
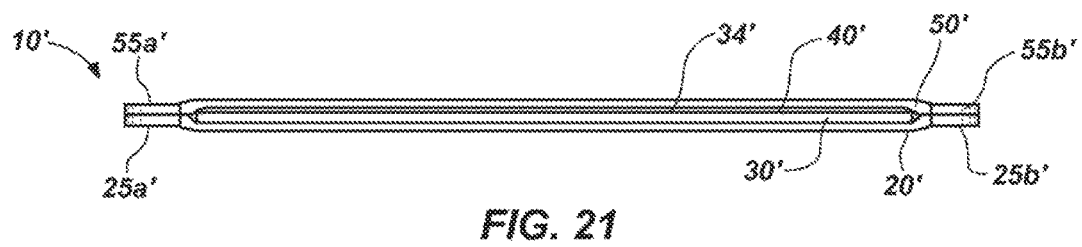
FIG. 21

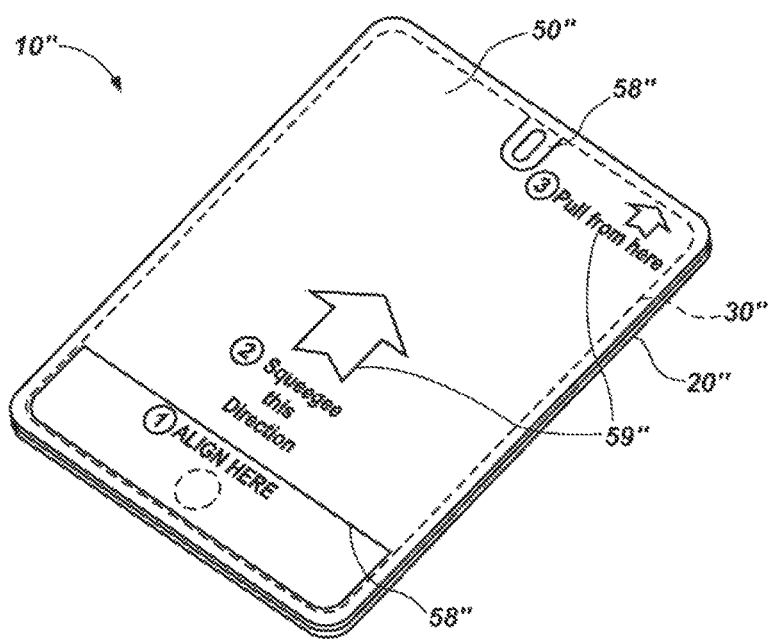
FIG. 25
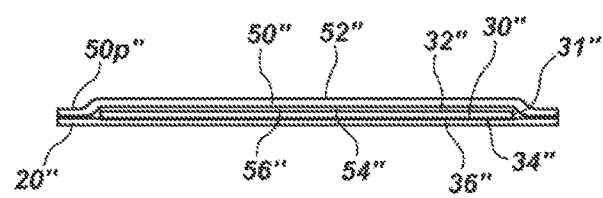
FIG. 28
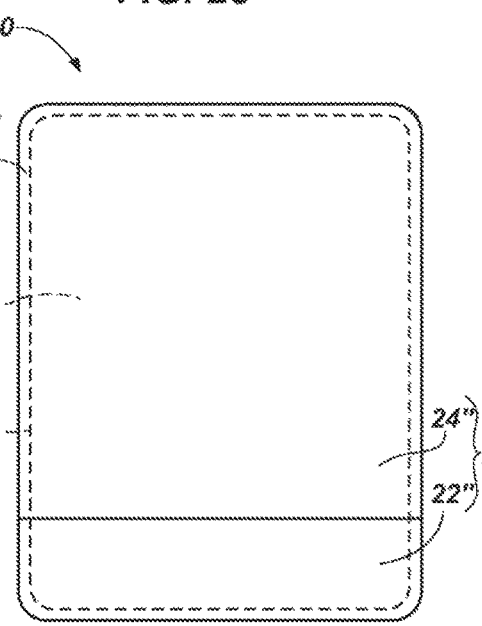
FIG. 26
FIG. 27

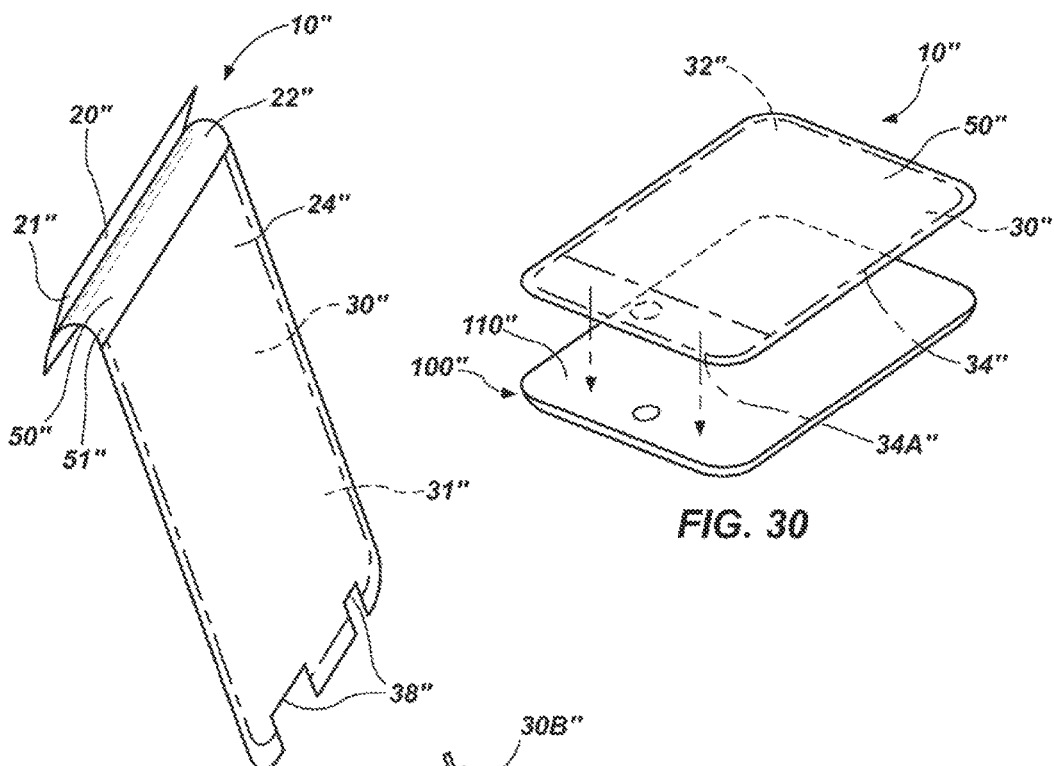
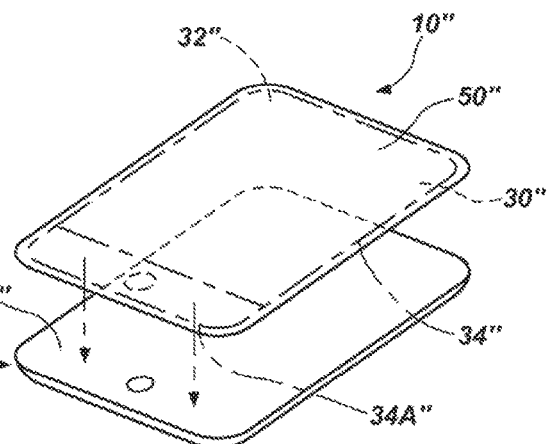
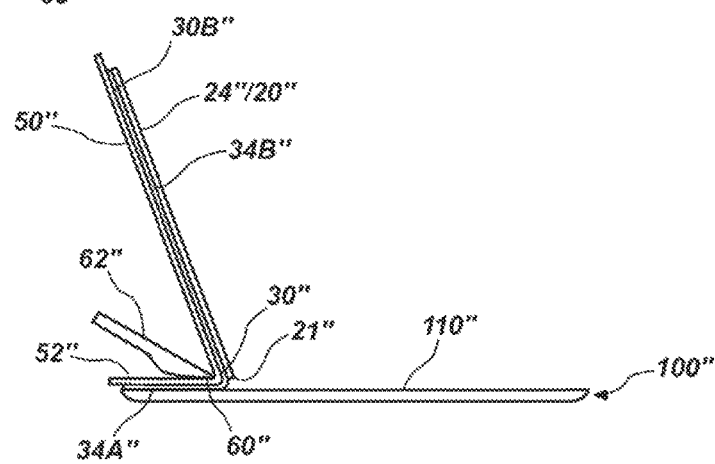
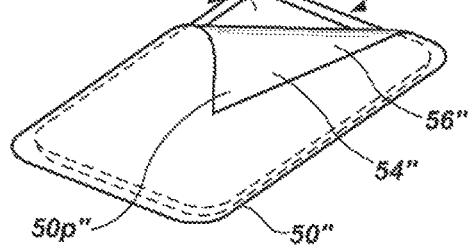
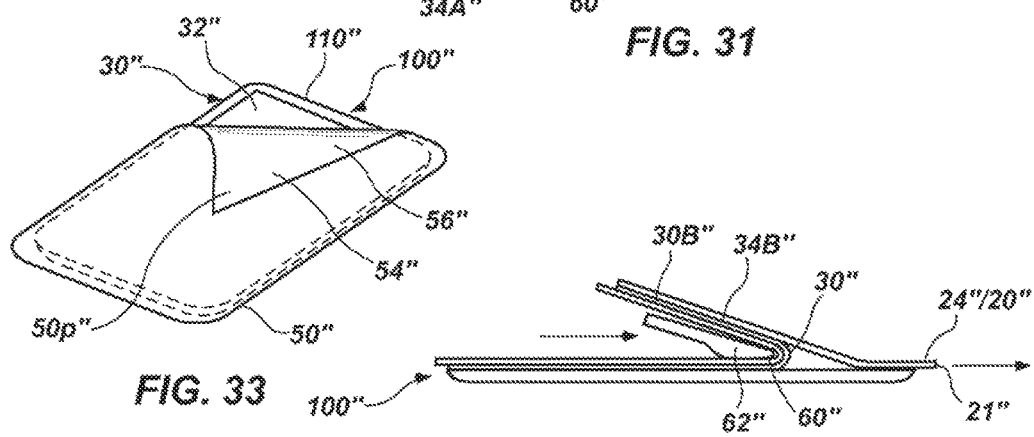
FIG. 29
FIG. 30
FIG. 31
FIG. 32
FIG. 33

DRY APPLY PROTECTIVE METHODS

CROSS-REFERENCE TO RELATED APPLICATIONS

This application is a continuation of U.S. patent application Ser. No. 13/865,175, filed on Apr. 17, 2013 and titled DRY APPLY PROTECTIVE SYSTEMS AND METHODS ("the '175 application"), issued as U.S. Pat. No. 9,777,195 on Oct. 3, 2017. In the '175 application, a claim for the benefit of priority was made, under 35 U.S.C. § 119(e), to the Apr. 17, 2012 filing date of U.S. Provisional Patent Application No. 61/625,550, titled DRY APPLY PROTECTIVE SYSTEMS AND METHODS ("the '550 Provisional application"). The '175 application is also a continuation-in-part of U.S. patent application Ser. No. 13/166,745, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS, filed on Jun. 22, 2011 ("the '745 application"), in which claims for the benefit of priority to U.S. Provisional Patent Application 61/357,972, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS and filed on Jun. 23, 2010 ("the '972 Provisional application") and to U.S. Provisional Patent Application 61/357,427, titled PROTECTIVE FILMS FOR DRY APPLICATION TO PROTECTED SURFACES, INSTALLATION ASSEMBLIES AND KITS INCLUDING THE FILMS, DEVICES PROTECTED WITH THE FILMS, AND ASSOCIATED METHODS and filed on Jun. 22, 2010 ("the '427 Provisional application") were made under 35 U.S.C. § 119(e). The entire disclosures of the '427 Provisional application, the '972 Provisional application, the '745 application, the '550 Provisional application, and the '175 application are, by this reference, incorporated herein.

TECHNICAL FIELD

This disclosure relates generally to systems and films for protecting surfaces of various substrates, including portable electronic devices. More specifically, this disclosure relates to protective systems and protective films that may be applied to a surface to be protected without the presence of visible air bubbles between the film and the surface and without the use of a solution to eliminate the presence of visible air bubbles. In addition, this disclosure relates to methods for protecting the surfaces of substrates, such as portable electronic devices.

BACKGROUND OF RELATED ART

A variety of protective films have been developed to provide substantially bubble-free protection for the surfaces of electronic devices without requiring the use of solutions to eliminate the air bubbles. Conventionally, these so-called "dry apply" protective films have suffered from a number of deficiencies. For example, it has been difficult to align them with the surface they are intended to protect. It is also difficult, and sometimes impossible, to remove visible air bubbles from between a conventional dry apply protective film and a surface to which it has been applied.

The construction of many conventional dry apply protective systems is quite simple: a protective film with an adherent surface and a backing. Often, the protective film is relatively rigid, which enables the removal of air bubbles from between the protective film and a protected surface with relative ease. Unfortunately, the rigidity of such a protective film also renders it prone to delamination from the protected surface. The backing protects the adherent surface until the dry apply protective film is applied to a surface to be protected.

The adherent surface of the protective film may be configured to electrostatically, or statically, adhere to a surface to be protected. While a statically adherent protective film may be readily removed from and repositioned upon a surface to be protected, it will lose its ability to adhere with repeated removal and repositioning. Statically adherent protective films also easily peel away from the surfaces they are intended to protect, leaving the surfaces with unsightly appearances and providing less than desirable protection.

Alternatively, the adherent surface may be coated with an adhesive material for securing the protective film to the surface to be protected. While an adhesive coating provides for stronger, more permanent adhesion of a protective film to a protected surface, the adhesive material suffers from a number of its own deficiencies. Once the backing of a conventional dry apply protective system is removed from the adherent surface, the adherent surface and any adhesive thereon is exposed and susceptible to contaminants, such as those present on the fingers and/or thumbs of an individual who is attempting to apply the protective film to the surface to be protected. Typically, when the adherent surface of a protective film comes into contact with contaminants (e.g., oil, dirt, etc., from an individual's fingers and/or thumbs; dust; etc.), the contaminants stick to the adherent surface. When the protective film is transparent, any contaminants on the adherent surface are trapped between the protective film and the protected surface, which may leave the protected device with an unsightly appearance.

SUMMARY

In various aspects, dry apply protective systems and dry apply techniques for securing protective films to surfaces that are to be protected are disclosed. Such a system and/or technique may be used to secure a protective film to a surface of a substrate that may benefit, aesthetically or otherwise, from protection (e.g., a surface of an electronic device, a crystal of a watch, etc.). In some embodiments, protective film may be applied to a surface without diminishing the aesthetics of the surface.

A dry apply protective system and/or technique may be configured to apply a protective film to one or more surfaces of a substrate (e.g., an electronic device, etc.), such as a surface through which information or images are visible (e.g., the surface of a monitor, or screen, that displays information or images, etc.). When configured for use over a surface through which information or images are to be viewed (e.g., over a monitor, or screen, of an electronic device, etc.), a protective film may be transparent. Protective films that are configured for application to other surfaces, including surfaces through which information or images need not be viewed, may be transparent, translucent, or opaque, and may, in various embodiments, include one or more decorative features that enhance the look of a surface of a device to which they are to be applied.

A dry apply protective system according to this disclosure, in various embodiments, includes a protective film. The protective film comprises a polymer layer that may ultimately protect the surface of a substrate, and includes an adherent surface and an opposite, exterior surface. The adherent surface may carry an adhesive material, such as a pressure-sensitive adhesive material, which may facilitate adhesion, or securing, of the protective film to a surface to be protected. When the protective film is assembled with other elements of the dry apply protective system, a backing may be secured to the adhesive material on the adherent surface, while an application layer, or an application tape, may be secured to the exterior surface of the protective film. In some embodiments, a dry apply protective system may also include a release layer between the application tape and the protective film.

The application tape may be fully superimposed over the protective film. The application tape may comprise a substantially transparent element. In some embodiments, the application tape may bear indicia. The indicia on the application tape may facilitate alignment of the application tape and, thus, of the protective film over a surface of a substrate. In addition, or as an alternative to facilitating alignment, the indicia on the application tape may also provide basic instructions on applying the protective film to the surface of the substrate. These indicia may be carried by (e.g., printed on, etc.) either an exterior surface of the application tape or its opposite, adherent surface.

The application tape may have substantially the same lateral dimensions as the protective film. Alternativly, at least one dimension (e.g., length, width, etc.) of the application tape may exceed the corresponding dimensions of the application tape and the protective film. Thus, a portion of the application tape, which is referred to herein as a "peripheral region," may extend laterally beyond corresponding edges of the application tape and the protective film. Each peripheral region of the application tape that is located laterally beyond a corresponding edge of the protective film may be superimposed with a corresponding portion of the backing. In some embodiments, the peripheral region may be configured to surround the outer periphery of the protective film and, thus, to be located laterally beyond the entire outer periphery of the protective film.

The exterior surface of the application tape, against which a securing element (e.g., a squeegee, a card, a finger, etc.) may be pressed and across which the securing element may be translated to secure the protective film to a surface to be protected, may be configured to enable the securing element to be translated thereacross in a smooth, continuous fashion. In some embodiments, the exterior surface of the application tape may be lightly textured or microtextured. The texturing of the exterior surface may minimize friction generated as the securing element is pressed against and translated across the exterior surface of the application tape.

An adhesive material on the adherent surface of the protective film may secure the adherent surface to the backing. Pressure-sensitive adhesives on an adherent surface of the application tape may similarly secure the adherent surface of the application tape and, thus, the application tape to the exterior surface of the protective film, or to a release layer positioned over the protective film. In addition, pressure-sensitive adhesives on portions of the adherent surface of the application tape that extend laterally beyond the protective film may secure those portions of the application tape to the backing.

The adhesive material on the adherent surfaces of the protective film and the application tape may be configured to remain on its respective adherent surface while leaving little or no adhesive residue on a surface to which the application tape or protective film was previously secured. Thus, adhesive material on the adherent surface of the application tape may be removed from the exterior surface of the application tape with little or no adhesive residue remaining on the exterior surface of the application tape. The application tape may be similarly removed from the exterior surface of protective film without leaving substantially any adhesive residue on the exterior surface of the protective film, but with adhesive material remaining on the adherent surface of the application tape. Adhesive material on the adherent surface of the protective film may likewise remain on the adherent surface as the protective film is peeled away from the backing or the surface of a substrate, with substantially no adhesive residue remaining on the backing or the surface of the substrate. Such selective adhesion may be accomplished in a variety of ways, including, but not limited to, selecting appropriate adhesive materials, configuring the adherent surfaces of the protective film, the application tape, and the application tape to retain the adhesive material (e.g., with surface roughness or other characteristics, etc.) better than the surfaces to which these elements will be applied, the process(es) by which the adhesive materials are applied to their respective adherent surfaces, or in any other suitable manner.

A release layer may be configured to be located over at least a portion of the protective film, to remain on the application tape as the application tape is pulled away from the protective film and, thus, to prevent the application tape from pulling the protective film away from a surface to be protected, or at least reduce the force with which the application tape may pull the protective film away from the surface of a substrate.

The backing may be configured to be substantially superimposed with the application tape. One or both of the backing and the application tape may include a feature (e.g., a tab, etc.) that protrudes beyond an outer periphery of the other the application tape and the backing. On the backing, such a feature may facilitate removal of the backing from the application tape and from the protective film. Such a protruding feature may lack adhesive material, enabling it to be used to position the protective film without sticking to an individual's fingers.

In some embodiments, the backing may be transparent, or at least translucent enough to enable an individual to view the surface to be protected as the dry apply protective system (including the protective film and, optionally, the application tape) is positioned thereover and secured thereto. The use of a transparent or even a translucent backing enables proper alignment of the protective film over the surface to be protected, even when the majority of the backing (e.g., the adhesion section thereof, etc.) remains in place over the adherent surface of the protective film; for example, while initially securing a small area of the adherent surface of the protective film to the surface to be protected.

In some embodiments, the backing may comprise a single element that is configured to be substantially superimposed with the application tape. In other embodiments, the backing may include two or more discrete sections, such as an alignment section and an adhesion section. An alignment section of the backing may be configured to cover a relatively small area of the adherent surface of the protective film. Thus, as the alignment section is removed from the adherent surface, a relatively small portion of the adherent surface, and any adhesive material thereon, are exposed, while the adhesion section of the backing continues to cover a much larger portion of the adherent layer. This configuration enables an initial securement of the protective film to a surface to be protected, as well as the ready removal of protective film from that surface if realignment of the protective film is desired. In some embodiments, the alignment section may comprise an elongate strip located adjacent to an edge of the protective film. Once initial securement is complete, the adhesion section of the backing may be removed from the adherent surface and the remainder of the protective film may be secured to the surface that is to be protected.

The backing may be relatively rigid when compared with the protective film and the application tape. The relative rigidity of the backing, the material(s) from which the backing is formed, or other characteristics may enable the backing to be readily separated and removed from the adherent surface of the application tape. Additionally, in embodiments where the backing is separated into an alignment section and an adhesion section, once the alignment section has been removed and the protective film has been initially secured to a surface to be protected, the relative rigidity of the adhesion section of the backing may enable its gradual removal as the protective film is gradually secured to the surface to be protected. In some embodiments, the relative rigidity of the adhesion section of the backing may enable it to be gradually removed without manipulation (e.g., holding, pulling, etc.) as a pressure front (e.g., that generated with a securing element, such as a squeegee, a card, a finger, etc.) is drawn across the protective film to gradually secure it to the protected surface. The relative rigidity of the backing and flexibility of the protective film (i.e., the backing is more rigid and less flexible than the protective film) may also minimize any exposure of the adherent layer (e.g., a thin, elongate section, etc.) during the application of the protective film to the surface to be protected, which may prevent or minimize the presence of air bubbles (including visible air bubbles) between the protective film and the protected surface, as well as contamination of the adherent surface.

The protective film of a dry apply protective system according to this disclosure and, optionally, the backing and or application tape of such a protective system may include one or more cutouts or other features that are configured to accommodate various features on or adjacent to the periphery of the surface that is to be protected by the protective film. In addition, these cutouts or other features may facilitate proper alignment of the protective film with the surface the protective film is intended to protect.

In another aspect, various application methods, which should be apparent from the preceding disclosure, are disclosed. An application method may include removal of the alignment portion of a backing from an adherent surface of a protective film. With a portion of the adherent surface exposed, the protective film may be aligned with and partially secured to a surface to be protected. Thereafter, a pressure front may be generated and translated (e.g., with a securing element, etc.) from over a region of the protective film that has already been secured to the surface that is to be protected toward an adjacent portion of the protective film that has not yet been secured to the surface to be protected. In some embodiments, as the pressure front is translated across the protective film, an adhesion section of the backing may separate from the adherent surface of the protective film and any adhesive material on the adherent surface. In embodiments where an application tape covers an exterior surface of the protective film, the application tape may be removed from the exterior surface of the protective film once the protective film has been secured to the surface that is to be protected.

Other aspects, as well as features and advantages of various aspects, of the subject matter disclosed herein will become apparent to those of ordinary skill in the art through consideration of the ensuing description, the accompanying drawings, and the appended claims.

BRIEF DESCRIPTION OF THE DRAWINGS

In the drawings:

FIG. 1 is a top view of an embodiment of a protective film configured for dry application to a surface of a substrate (e.g., an electronic device, etc.);

FIG. 2 is a side view of the embodiment of protective film of FIG. 1;

FIG. 3 provides a top view of an embodiment of a dry apply protective system, or an installation assembly, that includes a protective film of the type shown in FIGS. 1 and 2, as well as a release layer, an application tape and a backing;

FIG. 4 is a bottom view of the embodiment of dry apply protective system shown in FIG. 3;

FIGS. 5 and 5A are, respectively, a side view and an enlarged, partial side view of the embodiment of dry apply protective system illustrated by FIGS. 3 and 4;

FIGS. 13-18 depict embodiments of methods for installing a protective film on a surface of a substrate (e.g., an electronic device, etc.) using an embodiment of dry apply protective system such as that shown in FIGS. 3-6;

FIG. 20 is a top view of another embodiment of dry apply protective system;

FIG. 21 is a side view of the embodiment of dry apply protective system shown in FIG. 20;

FIG. 25 is a perspective view of yet another embodiment of a dry apply protective system;

FIG. 26 is a top view of the embodiment of dry apply protective system shown in FIG. 25;

FIG. 27 is a bottom view of the embodiment of dry apply protective system illustrated by FIG. 25;

FIG. 28 is a cross-sectional representation of the dry apply protective system of FIG. 25;

FIG. 29 shows removal of an alignment section of a backing from an adherent surface of a protective film of the embodiment of dry apply protective system shown in FIG. 25;

FIG. 30 illustrates an embodiment of alignment and initial securing of the protective film to a surface that is to be protected;

FIGS. 31 and 32 depict the application of a pressure front across the protective film to secure the same to the surface to be protected, including the simultaneous removal of an adhesion section of the backing from the adherent surface of the protective film; and FIG. 33 illustrates removal of the application tape from an exterior surface of the protective film.

DETAILED DESCRIPTION

Figure 6:
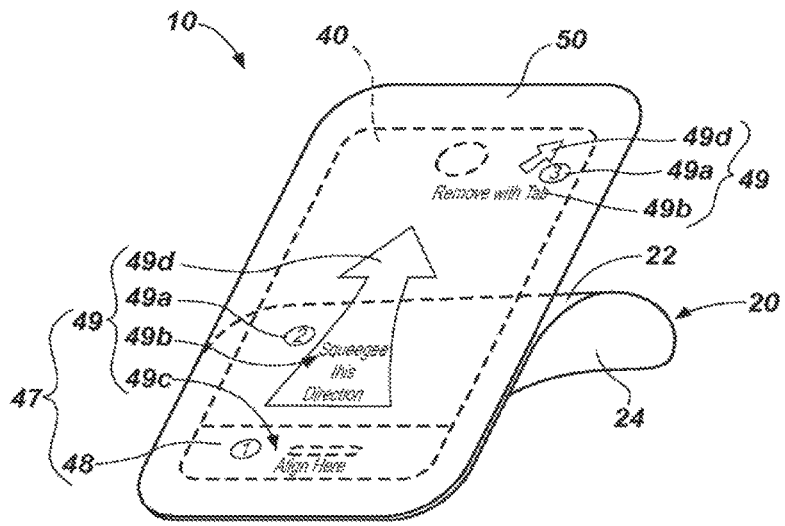
FIG. 6 shows the dry apply protective system of FIGS. 3-5 from which the backing has been partially removed.

FIGS. 1 and 2 illustrate an embodiment of a dry-apply protective film 30. The dry-apply protective film 30 is also referred to herein as a "protective film" for the sake of simplicity. The protective film 30 includes a substantially planar member with an exterior surface 32 and an opposite adherent surface 34, which is configured to be secured to a surface of a substrate (e.g., an electronic device, etc.). The adherent surface 34 carries an adhesive material 36, which enables the protective film 30 to be secured to the surface of the substrate by a so-called "dry-apply" process, which does not require the use of any "wet" chemicals.

The protective film 30 may be transparent, translucent, or opaque. The exterior surface 32 of the protective film 30 may be configured with a finish that appears (to the so-called "naked eye," without image enhancement, etc.) to be smooth (e.g., glossy, etc.), to have a matte finish, or to have any other desired texture. The exterior surface 32 of the protective film 30 may include features that provide privacy (e.g., only allow images to be viewed through the protective film 30 within a narrow range of angles around 90°, etc.). The exterior surface 32 may be reflective when viewed at certain angles. In some embodiments, the protective film 30 may include decorative features.

In some embodiments, the protective film 30 may include one or more layers. The material and thickness of each layer may be tailored to impart the protective film 30 with desired characteristics, or properties, as understood by those of skill in the art.

A variety of materials may be used to form the protective film 30. In a specific embodiment, the protective film 30 may comprise a polyurethane. A number of polyurethanes may provide desirable protective properties. In embodiments where the protective film 30 is transparent, some of these polyurethanes may also impart the protective film 30 with desirable optical properties (e.g., a clarity through which information or images may be viewed with little or no visible distortion (to the naked eye, without image enhancement, etc.), etc.). For the sake of simplicity, the term "polyurethane," as used herein, includes polymers that include urethane, or "carbamate," linkages. A polyurethane may also include urea linkages, as well as combinations of urethane and urea linkages (e.g., poly(urethane-urea)s, etc.). Some polyurethanes that are useful for forming the protective film 30 include backbones in which at least about 80% of the linkages are urethane or urea linkages.

Examples of commercially available polyurethanes that may be used to form the protective film 30 include, but are not limited to, those marketed under the trade names KRYSTALFLEX® by Huntsman Corporation of Auburn Hills, Mich.; DURAFLEX® and TEXIN® (e.g., the aliphatic ester-based polyurethane sold as TEXIN® DP7-3008) by Bayer Material Science, LLC, of Pittsburgh, Pa.; ARGOTHANE™ by Argotec, Inc., of Greenfield, Mass.; and TECOFLEX® (e.g., CLA-93AV) by Lubrizol Corporation of Wickliffe, Ohio; as well as polyurethanes marketed by American Polyfilm, Inc., of Branford, Conn., and by Stevens Urethane of Easthampton, Mass. (e.g., the extrudable aliphatic polyurethanes designated SS-1219-92 and SS-2219-92).

In addition or as an alternative to a polyurethane, a protective film 30 may include one or more of a polyvinyl chloride, a polyvinyl acetate, a polypropylene, a polyester, a poly(meth)acrylate, a polyethylene, and a rubbery resin (e.g., a silicone elastomer, etc.).

The adhesive material 36 carried by the adherent surface 34 of the protective film 30 may have any suitable thickness. In some embodiments, the adhesive material 36 may be applied to the adherent surface 34 in a film that has a thickness of about 5 microns to about 150 microns or, even more specifically, of about 30 microns to about 100 microns.

In embodiments where the protective film 30 is transparent, the exclusion of reactive components from the adhesive material 36 may impart the adhesive material 36 with optical clarity and, thus, minimize distortion of images that may be viewed through the transparent protective film 30.

The adhesive material 36 may substantially lack non-reacted reactive components, such as monomers. The adhesive material 36 may lack components, such as plasticizers, that may migrate from the adhesive material 36 and reduce adhesion of the protective film 30 to a surface that is to be protected.

In some embodiments, the adhesive material 36 may comprise a pressure-sensitive adhesive. A pressure-sensitive adhesive may be configured to semi-permanently secure the adherent surface 34 of the protective film 30 to a surface to be protected, but be selectively removed from the surface (e.g., when repositioning the protective film 30 relative to the surface, when removing a damaged protective film from the surface, etc.). In addition, a pressure-sensitive adhesive may leave little or no residue on the previously protected surface once the protective film 30 has been removed from, and no longer protects, that surface. Examples of pressure-sensitive adhesives that may be used as the adhesive material 36 include, but are not limited to, (meth)acrylates (e.g., acrylates, methacrylate, etc.), as well as adhesives that include chemistries based on natural and synthetic rubbers, polybutadiene and copolymers thereof, polyisoprene and copolymers thereof, and silicones (e.g., polydimethylsiloxane, polymethylphenylsiloxane, etc.). In a particular embodiment, the adhesive material 36 may include 2-ethyl hexyl acrylate, vinyl acetate, and polymerized acrylic acid monomers. Such an adhesive material is available from entrochem, inc., of Columbus, Ohio, under trade name ENTROCHEM™-ECA 340.

In other embodiments, the adhesive material 36 may include a heat-activated or a pressure-activated adhesive material.

The adhesive material 36 may include one or more additives. Examples of additives include, but are not limited to, cross-linking agents (e.g., aluminum cross-linkers, melamine cross-linkers, etc.).

In some embodiments, the adherent surface 34 and/or any adhesive material 36 thereon may include microchannels. In a specific embodiment, the microchannels may impart the adherent surface 34 and/or any adhesive material 36 thereon with a repetitive hexagonal pattern. The microchannels may enable air to be removed from between the adherent surface 34 and a surface to which the protective film 30 is secured, while the protective film 30 is secured to that surface and/or after the protective film 30 has been secured to that surface.

Turning now to FIGS. 3-5A, an embodiment of a dry apply protective system 10, which is also more simply referred to herein as a "system," is depicted. System 10 includes a protective film 30, as well as a backing 20, a release layer 40, and an application tape 50. In sequence from an adherent surface 14 of the dry apply protective system 10 to an opposite application surface 12, the dry apply protective system 10 includes the backing 20, the protective film 30, the release layer 40, and the application tape 50. More specifically, adherent surfaces 34, 44, and 54 of the protective film 30, the release layer 40, and the application tape 50, respectively, are secured, in sequence, by adhesive materials 36, 46, and 56 to an internal surface 22 of the backing 20 and to exterior surfaces 32 and 42 of the protective film 30 and the release layer 40.

In the depicted embodiment, the release layer 40 is completely superimposed over the protective film 30. The release layer 40 may be slightly smaller than the protective film 30 to enable the protective film 30 to adhere to the application tape 50 after the backing 20 is removed from the protective film 30 and from the application tape 50. Alternatively, the release layer 40 may have the same lateral dimensions or substantially the same lateral dimensions (i.e., within acceptable tolerances, with the exception of any protruding edges or tabs that facilitate removal of the release layer 40 from the protective film 30, etc.) as the protective film 30. The application tape 50 may, in contrast, have at least one lateral dimension that exceeds a corresponding lateral dimension of the release layer 40 and the protective film 30. Thus, the application tape 50 may include at least one peripheral region 51 that extends laterally beyond corresponding four outer edges 41 and 31 of the release layer 40 and the protective film 30, respectively. In the depicted embodiment, peripheral regions 51 of the application tape 50 extend laterally beyond each of the four outer edges 41 of the release layer 40 and beyond each of the four outer edges 31 of the protective film 30. The backing 20 may have the same lateral dimensions or substantially the same lateral dimensions (i.e., within acceptable tolerances, with the exception of any protruding edges or tabs that facilitate removal of the release layer 40 from the protective film 30, etc.) as the application tape 50.

In such an embodiment, the adherent surface 54, at peripheral portions 50p of the application tape 50, is exposed laterally beyond the release layer 40 and the protective film 30. Thus, when the elements of the dry apply protective system 10 are assembled, the adherent surface 34 of the protective film 30 and the peripheral portions 50p of the application tape 50 that are exposed laterally beyond the protective film 30 are secured to the interior surface 22 of the backing 20. This arrangement protects the adhesive material 36 on the adherent surface 34 of the protective film 30 during manufacture (e.g., as installation assemblies 10 are die cut, etc.), packaging, and storage of the dry apply protective system 10.

Now, embodiments of the backing 20, the release layer 40, and the application tape 50 of a dry apply protective system 10 will be described.

The backing 20 of a dry apply protective system 10 may comprise a thin, flexible, substantially planar element with an interior surface 22 and an opposite exterior surface 24. The exterior surface 24 is configured to be located at the adhesion surface 14 of the dry apply protective system 10, while the interior surface 22 is configured to temporarily adhere to the adherent surface 34 of the protective film 30 and to peripheral portions 50p of the adherent surface 54 of the application tape 50. In a specific embodiment, the backing 20 is formed from paper or a paper-like material (e.g., a sheet formed at least partially from polymer fibers, etc.). The interior surface 22 of the backing 20 may have a smoothness that enables the backing 20 to be readily removed from the adherent surfaces 34 and 54 of the protective film 30 and the application tape 50, respectively, and that minimizes any adhesive material 36 residue thereon as the interior surface 22 is removed from adherent surface 34 of the protective film 30. In some embodiments, such smoothness may be achieved by way of a polymer coating on the interior surface 22 of the backing 20.

Some embodiments of a backing 20 may be rigid in comparison to the protective film 30, yet still slightly flexible. The backing 20 may also be transparent, substantially transparent, or translucent enough to identify various features of a surface to be protected. A variety of materials, including, but not limited to, a biaxially-oriented polyethylene terephthalate (BoPET) or a stretched polyester film (e.g., that marketed by du Pont de Nemours & Co. under the MYLAR® trademark, etc.), may possess these characteristics and, thus, be used for the backing 20.

The release layer 40 includes an adherent surface 44, which may carry adhesive material 46 and may be configured to be temporarily secured to the exterior surface 32 of the protective film 30. The release layer 40 may be configured facilitate removal of the application tape 50 from the protective film 30 without pulling the protective film 30 off of the surface to which it has been applied. The release layer 40 may also prevent damage to the protective film 30 as the protective film 30 is secured to the surface of a substrate. In some embodiments, including those where the protective film 30 comprises a transparent element for protecting the surface of a monitor, or screen, of an electronic device, the release layer 40 may be configured to preserve the optical properties of the protective film 30 during application of the protective film 30 to the surface of the monitor, or screen.

In some embodiments, the release layer 40 may have a thickness that absorbs and, optionally, distributes potentially damaging forces that may be applied to secure the protective layer 30 to the surface of the substrate. Alternatively, or in addition, the release layer 40 may be formed from a material with a hardness that will absorb and/or distribute forces that may be applied to secure the protective layer 30 to the surface of the substrate, but could otherwise damage the protective layer 30.

Although optional, when used, the release layer 40 may comprise a material that may facilitate a differential release between the application tape 50 and the protective film 30. The inclusion of a release layer 40 may be desirable when adhesion between the application film 50 and the protective film 30 is stronger than adhesion between the protective film 30 and the surface that is to be protected.

In some embodiments, the release layer 40 may comprise a rigid, but flexible, polymeric film. The use of a material that is harder than the material of the protective film 30 (e.g., harder than a Shore A hardness of about 90, etc.) may provide a desired balance of adhesion between adjacent layers of the dry apply protective system 10. In specific embodiments, the release layer 40 may comprise a polyester or a polypropylene. Polyester and polypropylene films are available from a variety of vendors, including, without limitation, E.I. du Pont de Nemours and Co. of Wilmington, Del., and Exxon Mobil Corporation of Irving, Tex.

The adhesive material 46, when carried by the adherent surface 44 of the release layer 40 and secured to the exterior surface 32 of the protective film 30, may have an adhesive strength sufficient to enable the release layer 40 to remain in place on the exterior surface 32 of the protective film 30 as the application tape 50 is removed from the exterior surface 42 of the release layer 40. The adhesive strength of the adhesive material 46 on the adherent surface 44 of the release layer 40 may also enable removal of the release layer 40 from the exterior surface 32 of the protective film 30 without overcoming the adhesive strength with which the adhesive material 36 on the adherent surface 34 of the protective film 30 secures the protective film 30 to a surface of a substrate. Thus, the release layer 40 may be removed from the exterior surface 32 of the protective film 30 without pulling the adherent surface 34 of the protective film 30 from the surface of the substrate. In some embodiments, one or more of the adhesive material 46, the adherent surface 44 of the release layer 40, and the exterior surface 32 of the protective film 30 may be configured to enable removal of the release layer 40 from the exterior surface 32 of the protective film 30 while leaving little or no residue of adhesive material 46 on the exterior surface 32.

The application tape 50 includes an adherent surface 54, which carries adhesive material 56 and is configured to be temporarily secured to the exterior surface 42 of the release layer 40. The application tape 50 is configured to facilitate alignment of the protective film 30 over a surface of a substrate and to facilitate preliminary or initial adhesion of the protective film 30 to the surface of the substrate. In this regard, the application tape 50 may comprise a relatively thin, flexible film of somewhat transparent material.

In a specific embodiment, the application tape 50 may comprise a film available from entrotech, inc., under the trade designation ENTROFILM™.

The adhesive material 56 on the application tape 50, when carried by the adherent surface 54 of the application tape 50 and adhered to the exterior surface 42 of the release layer 40, may have an adhesive strength that may enable the application tape 50 to be removed from the exterior surface 42 of the release layer 40 without overcoming the adhesive strength with which the adhesive material 46 on the adherent surface 44 of the release layer 40 is secured to the exterior surface 32 of the protective film 30. Thus, the application tape 50 may be removed from the exterior surface 42 of the release layer 40 without removing the adherent surface 44 of the release layer 40 from the exterior surface 32 of the protective film 30. The adhesive material 56, the adherent surface 54 of the application tape 50, or the exterior surface 42 of the release layer 40, the material from which the release layer 40 is formed, or any combination of these features, may be configured to enable removal of the application tape 50 from the exterior surface 42 of the release layer 40 while leaving little or no residue of adhesive material 56 on the exterior surface 42.

In a specific embodiment, an adhesive material available from entrotech, inc., under the trade name ENTROCHEM' may be used as the adhesive material 56.

In some embodiments, including those where a release layer 40 remains in place upon the exterior surface 32 of the protective film 30 when the application layer 50 is removed from the protective film 30, a dry apply protective system 10 according to the present invention may also include a release tab 70. The release tab 70 may be configured to enable removal of the release layer 40 from the protective film 30. The release tab 70, which may initially be separate from the remainder of the dry apply protective system 10, comprises a substantially planar, somewhat flexible element with an application surface 72 and an opposite, adherent surface 74. The adherent surface 74 may carry an adhesive material 76. In addition, a backing element 78 may be disposed over the adherent surface 74 of the release tab 70 and secured to the adherent surface 74 with the adhesive material 76.

The adhesive material 76 may comprise a pressure-sensitive adhesive, or include a pressure-sensitive component, that will secure the release tab 70 to the exterior surface 42 of the release layer 40 when the adherent surface 74 of the release tab 70 is positioned against the exterior surface 42 of the release layer 40 and sufficient pressure is applied to the application surface 72 of the release tab 70. As the release tab 70 is configured to enable removal of the release layer 40 from the protective film 30, one or more of the adhesive material 76, the adherent surface 74 by which the adhesive material 76 is carried, and the exterior surface 42 of the release layer 40 may be configured to effectively impart the adhesive material 76 with an adhesion strength that exceeds the strength with which the adherent surface 44 of the release layer 40 is secured to the exterior surface 32 of the protective film 30. Conversely, the strength with which the adhesive material 76 secures the adherent surface 74 of the release tab 70 to the exterior surface 42 of the release layer 40 may be insufficient to overcome the strength with which the adhesive material 36 on the adherent surface 34 of the protective film 30 secures the protective film 30 to a surface of a substrate. Thus, the release tab 70 may enable removal of the release layer 40 from the protective film 30 without enabling removal of the protective film 30 from the surface of the substrate.

As shown in FIG. 6, in which the backing 20 has been partially peeled away from the remainder of the dry apply protective system 10, some embodiments of the release layer 40 may include indicia 47, which may be visible from the exterior surface 42 of the release layer 40. The indicia 47 may include one or more alignment features 48, one or more instructional features 49, or any other features that may facilitate or enable proper application of the protective film 30 to the surface of a substrate. In the illustrated embodiment, the indicia 47 include both an alignment feature 48 and instructional features 49a, 49b, 49c, and 49d (collectively, instructional features 49). More specifically, the illustrated alignment feature 48 facilitates positioning of a bottom edge of the release layer 40 and the adjacent protective film 30 against a bottom edge of a surface of a monitor of an electronic device to which the protective film 30 is to be secured, while the instructional features 49 include numbers 49a identifying the order in which various acts are to be carried out, or effected, as well as textual indicators 49b and 49c and graphical indicators 49d of the acts that are to be performed. In some embodiments, the indicia 47 may be the same color as the any underlying elements, which may reduce the visibility of the indicia 47 prior to use of the dry apply protective system 10 to secure the protective film 30 to the surface of a substrate.

In other embodiments, indicia 47 may be included on the application tape 50 of a dry apply protective system 10.

Figure 7:
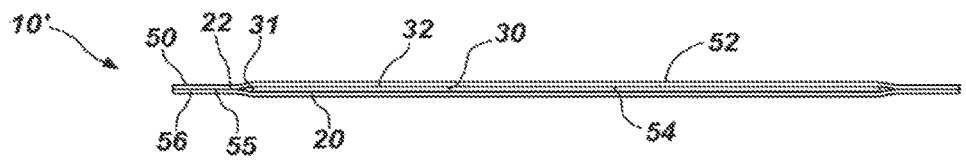
FIG. 7 is a side view of another embodiment of dry apply protective system.

FIG. 7 illustrates an embodiment of dry apply protective system 10' that lacks a release layer 40 (FIGS. 3-6). In such an embodiment, the adhesive material 56 on the adherent surface 54 of the application tape 50 secures the application tape 50 directly to the exterior surface 32 of the protective film 30. A backing 20 covers the adherent surface 34 of the protective film 30, as well as peripheral portions 50p of the adherent surface 54 that are located laterally beyond outer edges 31 of the protective film 30.

Regardless of whether a dry apply protective system 10, 10' (or any other embodiment of a dry apply protective system) includes a release layer 40 (FIG. 5A), the additional application tape 50 protects the protective film 30 during handling, storage, shipping, and as the protective film 30 is applied to a surface that is to be protected.

An embodiment of a method for manufacturing a dry apply protective system 10 is illustrated in reference to FIGS. 8-12.

Separate rolls (not shown) of a release film 20', a polymer film 30', a protective film 40', and an application film 50' may be provided. Each of the polymer film 30', the protective film 40', and the application film 50' may include an adherent surface 34, 44, and 54, respectively, onto which an adhesive material 36, 46, and 56, respectively, has been applied.

The release film 20' and the polymer film 30' may be formed in environments that are free of contaminants (e.g., dust, other particles, etc.) (e.g., in a clean room environment, such as an ISO class 5 clean room; in a cleaner environment, such as an ISO class 1 clean room; etc.). In other embodiments, an interior surface 22' of the release film 20' and an adherent surface 34 (FIG. 21) of the polymer film 30' may be cleaned to remove any contaminants before an adhesive material 36 (FIGS. 2 and 5A) is applied to the adherent surface 34' (FIG. 21) and secures the interior surface 22' to the adherent surface 34'.

The adhesive material 36 may also be manufactured in an environment that is free of contaminants, or it may be filtered to remove contaminants. The adhesive material 36 may then be applied to the adherent surface 34 of the polymer film 30' is a contaminant-free environment. In specific embodiments, each cubic meter of adhesive material 36 may include, on average, no more than $10^5$ (i.e., 100,000) contaminant particles with dimensions of larger than 0.1 µm; fewer, on average, than 30 contaminant particles with dimensions of larger than 5 µm; on average, no more than ten (10) contaminant particles with dimensions of larger than 0.1 µm; or no more than an average of two contaminant particles with dimensions larger than 0.2 µm; etc.

In some embodiments, one or both of the protective film 40' and the application film 50' may also be contaminant free.

Figure 8:
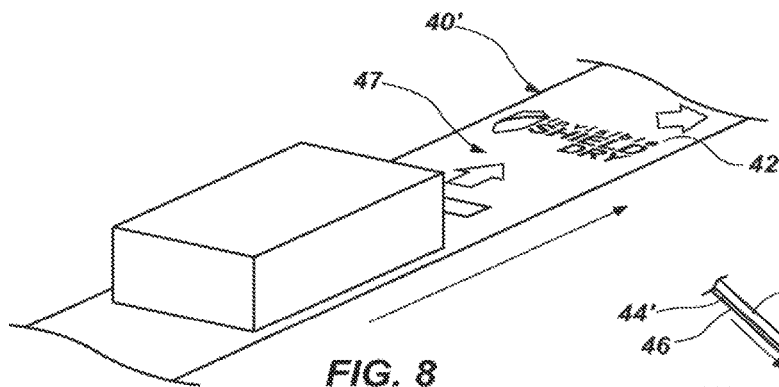
FIGS. 8-12 illustrate an embodiment of a process for manufacturing an embodiment of dry apply protective system, such as that shown in FIGS. 3-6.

Indicia 47 may be printed onto an exterior surface 42' of the protective film 40' in a suitable manner, as shown by FIG. 8.

Figure 9:
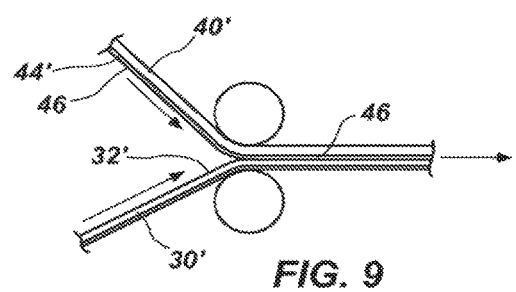

As illustrated by FIG. 9, the adherent surface 44' of a protective film 40', from which the release layer 40 of the dry apply protective system 10 (FIGS. 3-6) is formed, is brought into contact with, or at least in close proximity to, an exterior surface 32' of the polymer film 30', from which the protective film 30 (FIG. 10) is ultimately formed. As the adherent surface 44' and the exterior surface 32' are brought together, the adhesive material 46 on the adherent surface 44' secures the protective film 40' to the exterior surface 32' of the polymer film 30'.

Figure 10:
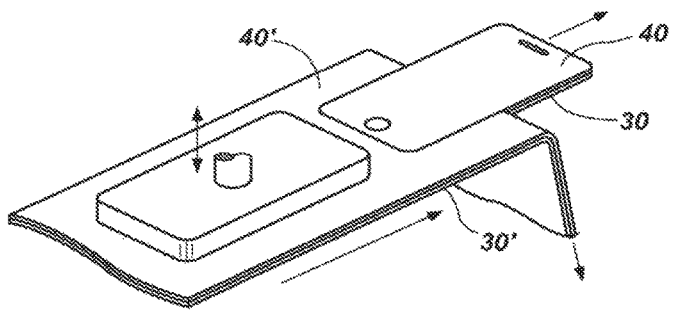

One or more protective film 30—release layer 40 laminates may then be defined from the laminate of the polymer film 30' and the protective film 40', as illustrated by FIG. 10. Without limitation, the polymer film 30'—protective film 40' laminate may be die cut, with the resulting protective film 30 (and release layer 40) having a desired configuration; e.g., a shape that is designed to protect a surface of a particular device.

Figure 11:
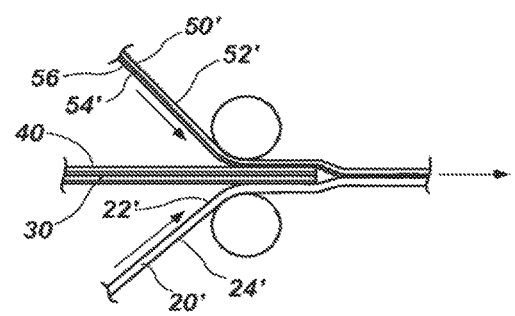

As shown in FIG. 11, each protective film 30—release layer 40 laminate may be disposed between an interior surface 22' of the release film 20' and an opposed adhesive material 56-coated adherent surface 54' of the application film 50'. As pressure is applied to opposite exterior surfaces 24' and 52' of the release film 20' and the application film 50', respectively, adhesive material 56 on the adherent surface 54' of the application film 50' secures the adherent surface 54' to the exterior surface 42 (FIG. 5A) of each release layer 40 and to portions of the interior surface 22' of the release film 20' that are located laterally beyond the outer edges 31 and 41 (FIG. 5) of the protective film 30 and the release layer 40, respectively. Thus, each protective film 30—release layer 40 laminate is captured and secured in place between the release film 20' and the application film 50'.

Figure 12:
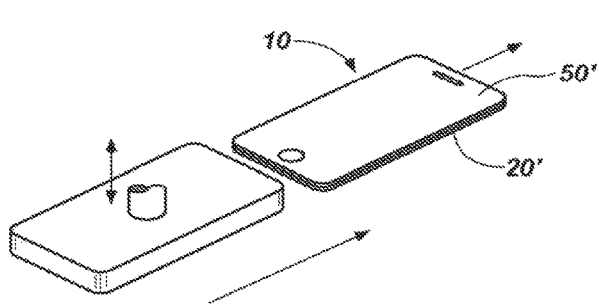

Thereafter, as illustrated by FIG. 12, the release film 20' and the application film 50' may be cut (e.g., die cut, etc.) to respectively define the backing 20 and the application tape 50 of each dry apply protective system 10 (FIGS. 3-6).

Referring now to FIGS. 13-18, an embodiment of a method for protecting a surface 110 of a substrate 100 (e.g., an electronic device, etc.) is explained.

Figure 13:
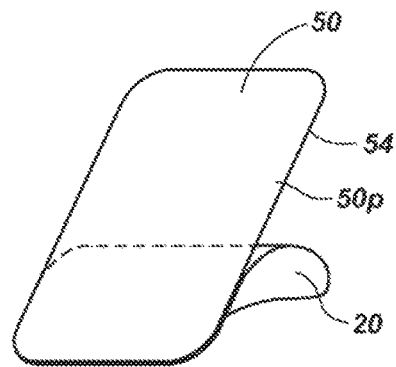

In FIG. 13, the backing 20 is removed from the peripheral portions 50p (FIG. 5) of the adherent surface 54 of the application tape 50 of a dry apply protective system 10, and from the adherent surface 34 of the protective film 30 of the dry apply protective system 10 (FIG. 5A). In some embodiments, as shown in FIG. 6, indicia 47 may provide instructions on application of the protective film 30 to the surface 110 (FIG. 14) of the substrate 100.

Figure 14:
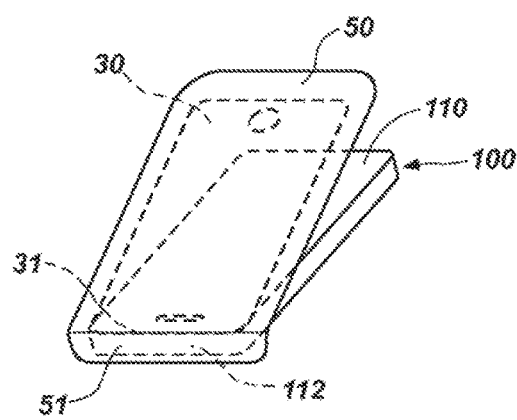

Next, as shown in FIG. 14, an outer edge 31 of the protective film 30 may be aligned with a corresponding feature (e.g., an edge of a surface 110, an edge of a monitor, etc.) on the surface 110 of the substrate 100. With the protective film 30 properly aligned, a peripheral region 51 of the application tape 50, which peripheral region 51 is located laterally adjacent to the outer edge 31 of the protective film 30, may be secured to a corresponding location (e.g., a bottom edge of the substrate 100, as illustrated, etc.) adjacent to the surface 110 of the substrate 100.

Figure 15A:
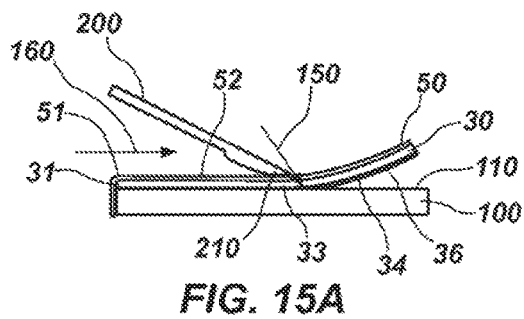
Figure 15B:
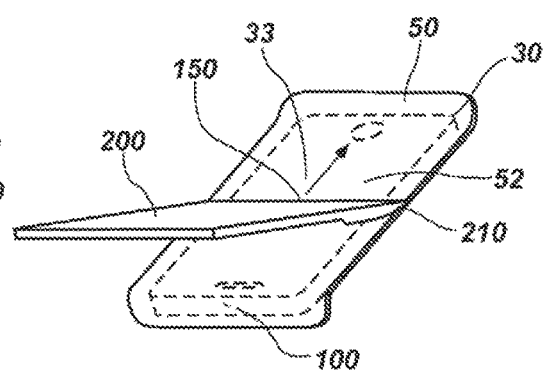

As depicted by FIGS. 15A and 15B, a pressure front 150 (e.g., a pressure of about 360 g/cm², etc.) may be established at or just outside of the outer edge 31 of the protective film 30. In the depicted embodiment, the pressure front 150 is substantially linear, although the application of pressure fronts of other configurations (e.g., curved pressure fronts, chevron pressure fronts, pressure points, etc.) may also be used. The pressure front 150 may have a width that is substantially the same as or exceeds a corresponding dimension of the protective film 30. The pressure front 150 may be established by positioning an edge 210 of a pressure application element 200, such as the depicted squeegee, a card, a finger, or the like against the exterior surface 52 of the application tape 50 at the peripheral region 51. Once the pressure front 150 has been established, the pressure application element 200 may be moved in a direction 160 transverse (e.g., perpendicular, substantially perpendicular (i.e., such that during linear movement, the pressure front 150 will completely cross a corresponding dimension of the protective film 30), etc.) to an orientation of the pressure front 150. The pressure applied at the pressure front 150 may be constant or substantially constant (i.e., sufficient to force the adhesive 36 on the adherent surface 34 of the protective film 30 against the surface 110 of the substrate 100, etc.). Movement of the pressure front 150 may be continuous or substantially continuous (i.e., varied rate of movement, but no stopping until the pressure front 150 has moved completely over the protective film 30). Such action may adhere the adherent surface 34 of the protective film 30 to the surface 110 of the substrate 100 while removing air gaps, or bubbles, from between a central region 33 of the protective film 30 and the surface 110 of the substrate 100.

Figure 15C:
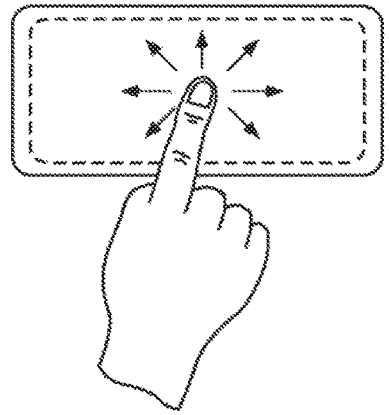

As an alternative, as depicted by FIG. 15C, an individual may use his or her finger(s) to secure the protective film 30 to the surface 110 of the substrate 100. Without limitation, an individual may apply pressure to the protective film 30 through the application tape 50 (and, optionally, through the release layer 40) (FIGS. 3-5). The finger(s) may be moved over the protective film 30 to secure the protective film 30 to the surface 110 and to remove air bubbles from between the protective film 30 and the surface 110 until the protective film 30 is sufficiently secured to the surface 110 and has a desired appearance.

Figure 16:
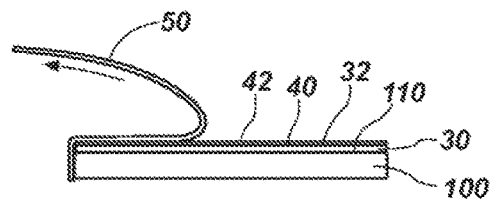

With the protective film 30 at least partially secured to the surface 110 of the substrate 100, the application tape 50 may be removed from over the protective film 30, as shown in FIG. 16.

FIG. 17 illustrates an embodiment of the manner in which any air gaps, or bubbles, between the protective film 30 and the surface 110 (FIG. 16) of the substrate 100 to which the protective film 30 has been applied, may be removed from locations that are adjacent to one or more outer edges 31 of the protective film 30. In particular, one or more pressure fronts 170a, 170b, etc., may be applied over the protective film 30 at locations between the central region 33 of the protective film 30 and outer edges 31 of the protective film. The pressure fronts 170a, 170b, etc., may be oriented parallel to or substantially parallel to corresponding outer edges 31 of the protective film 30, over which the pressure fronts 170a, 170b, etc., will move. Once established, each pressure front 170a, 170b, etc., may move in a direction 180a, 180b, etc., that extends from an initial position over the central region of the protective film 30 to a terminal position over or outside of the corresponding outer edge 31.

In some embodiments, the pressure fronts 170a, 170b, etc., may be applied after the application tape 50 has been removed (FIG. 16), in which case they may be applied directly to and move over the exterior surface 32 of the protective film 30. Alternatively, the pressure fronts 170a, 170b, etc., may be applied to the exterior surface 52 of the application tape 50 (FIGS. 15A and 15B) prior to its removal from the exterior surface 32 of the protective film 30.

Once all or substantially all of the air gaps, or bubbles, have been removed from between the protective film 30 and the surface 110 of the substrate 100, a release layer 40 or application tape 50, if any, on the exterior surface 32 of the protective film 30 may be removed from the exterior surface 32 of the protective film 30. In the embodiment shown in FIG. 18, removal of a release layer 40 may be effected with a release tab 70 (see also FIG. 5). Specifically, a backing 78 (FIG. 5) may be removed from the adherent surface 74 of the release tab 70 to expose the adhesive material 76 on the adherent surface 74. With the adhesive material 76 exposed, the release tab 70 may be positioned over the exterior surface 42 of the release layer 40 at or near an outer edge 41 of the release layer 40, then secured to the exterior surface 42 by applying pressure sufficient to the application surface 72 of the release tab 70. The release tab 70 may then be grasped and pulled away from the surface 110 of the substrate 100, which also overcomes the strength with which the adhesive 46 on the release layer 40 secures the adherent surface 44 of the release layer 40 to the exterior surface 32 of the protective film 30. Thus, as the release tab 70 is pulled away from the surface 110 of the substrate 100, it pulls the release layer 40 with it, removing the release layer 40 from the exterior surface 32 of the protective film 30.

Figure 19:
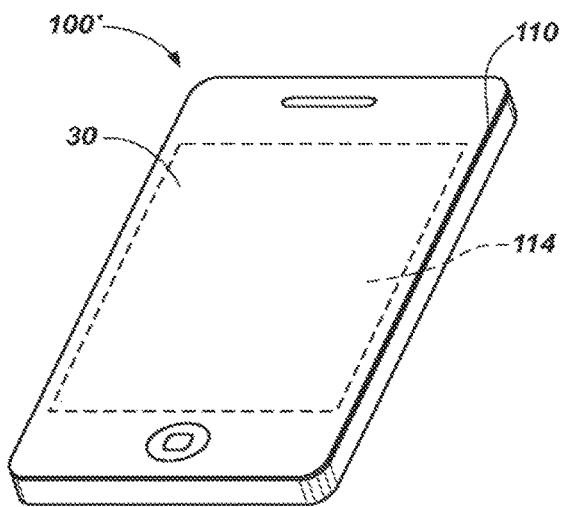
FIG. 19 shows an embodiment of a substrate (e.g., an electronic device, etc.) including a dry-apply protective film on at least one surface thereof.

An embodiment of the protected substrate 100 is shown in FIG. 19. Specifically, the substrate 100 includes a surface 110 that is covered by a protective film 30. The protective film 30 has been secured to the surface 110 using a dry apply process, which eliminates the need for wet adhesives that may otherwise any warranty covering the substrate 100. In the depicted embodiment, the protective film 30 substantially covers a surface 110 through which a monitor 114 of a portable electronic device (i.e., the substrate 100) is visible. The transparency of protective film 30 and the adhesive material 36 that secures the same to the surface 110, the lack of any contaminants within the adhesive material 36 or otherwise between the protective film 30 and the surface 110, the absence of any imperfections in the protective film 30 from the installation process, and the lack of any air voids, or bubbles, between the protective film 30 and the surface 110 may optimize the aesthetics of the protective film 30 and enable distortion-free viewing of the monitor 114.

In the event that, with repeated use of the substrate 100, one or more peripheral edges 31 of the protective film 30 peel away from the surface 110, the protective film 30 is scratched, or the protective film 30 otherwise gains an undesirable appearance, it may be peeled from the surface 110 and replaced with another protective film 30.

Other surfaces of the substrate 100 may be covered with transparent, translucent, and/or opaque protective films in a manner consistent with teachings of this disclosure.

Turning now to FIGS. 20-24, another embodiment of a dry apply protective system 10', which may simply be referred to as a "system 10'," is illustrated. Like system 10, system 10' includes a protective film 30', a backing 20', a release layer 40' and an application tape 50'. Each of these elements may be configured in any suitable manner.

In the depicted embodiment (see FIG. 23), the release layer 40' and the application tape 50' may be have sufficient transparency to enable a consumer to accurately align the protective film 30' with a surface of a substrate 100' to which the protective film 30' us to be secured. In some embodiments, the backing 20' may also be transparent or substantially transparent. A transparent or substantially transparent backing 20' may enable a consumer to confirm that the protective film 30' will provide the desired coverage without requiring removal of the backing 20' from either the protective film 30' or the application tape 50'.

The release layer 40' is configured to completely cover an exterior surface of the protective film 30', and may have substantially the same lateral dimensions as the protective film 30', or be configured to be substantially superimposed with the protective film 30'.

The backing 20' and the application tape 50' are both larger than the protective film 30'. As illustrated, when assembled with the protective film 30', each peripheral edge of both the backing 20' and the application tape 50' is located laterally beyond its corresponding peripheral edge of the protective film 30'. In the illustrated embodiment, the backing 20' and the application tape 50' are initially (when the dry apply protective system 10' is provided to a consumer) substantially superimposed with one another.

Figure 22:
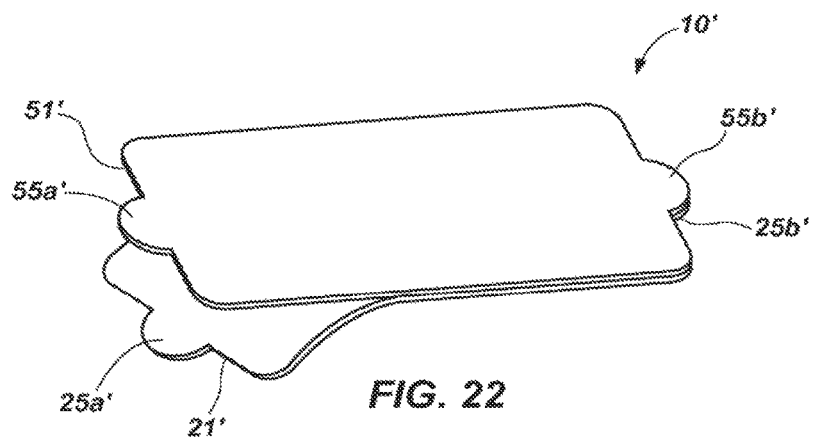
FIGS. 22-24 depict an embodiment of a technique for using the dry apply protective system of FIGS. 20 and 21 to apply a protective film to a surface of a substrate.
Figure 23:
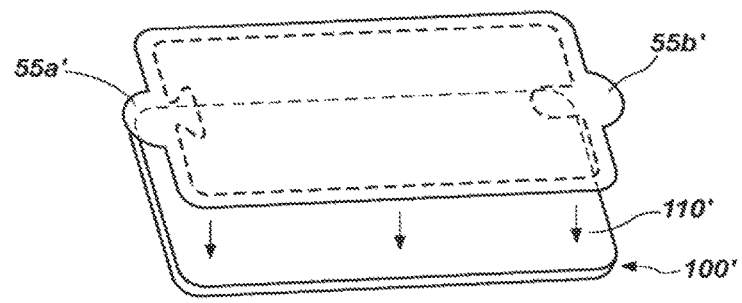
Figure 24:
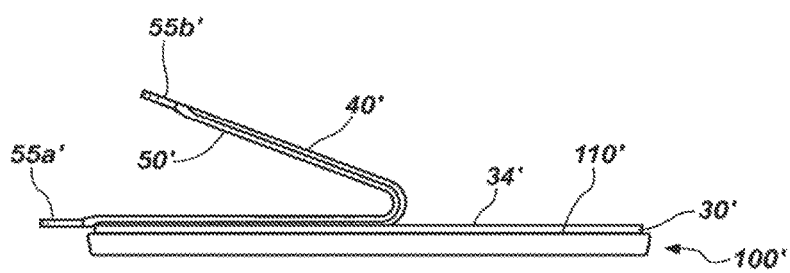

As FIGS. 20 and 21 show, the backing 20' of the system 10' may include a tab 25a' or another feature that protrudes from the outer periphery 21' of the backing 20'. Optionally, the backing 20' may include another tab 25b' or other protruding feature, which may be positioned adjacent to a different edge of the outer periphery 21' than the tab 25a' (e.g., an opposite edge of the outer periphery 21', etc.) In some embodiments, the application tape 50' may include a corresponding tab 55a' or other protruding feature that is configured to be superimposed with the tab 25a'. In such an embodiment, the tab 55a' may comprise a portion of the application tape 50' that has not been coated with an adhesive material. The tab 25a' may be configured to enable grasping of a portion of the backing 20' and to facilitate removal of the backing 20' from the protective film 30' and from the application tape 50' (e.g., as the tab 25a' is pulled away from the application tape 50' or the optional tab 55a', etc.), as depicted by FIG. 22. The tab 25a' or the optional tab 55a' may include one or more indicia (e.g., a number, such as a "1" or the series of 1's depicted in FIG. 20; etc.) that correspond to the order in which the tab 25a' is to be used to remove the backing 20' from the protective film 30' and from the application tape 50'.

The application tape 50' may also include a tab 55b' or another feature that protrudes from an outer periphery 51' of the application tape 50' and, optionally, beyond an adjacent, superimposed portion of an outer periphery 21' of the backing 20'. Unlike the majority of the application tape 50', the tab 55b' may lack a coating of adhesive material. In the illustrated embodiment, the tab 55b' of the application tape 50' is positioned at an opposite side (e.g., an opposite end, etc.) of the system 10' from the tab 25a' of the backing 20'. Like the tab 25a' of the backing 20', the tab 55b' of the application tape 50' may be configured to enable an individual to grasp the application tape 50' and to remove it (e.g., peel it away from, etc.) from the protective film 30' and from a substrate 100' to which the protective film 30' has been secured. The tab 55b' may include one or more indicia (e.g., a number, such as a "2" or the series of 2's depicted in FIG. 20; etc.) that correspond to the order in which the tab 55b' is to be used to remove the application tape 50' from the protective film 30'.

In embodiments where the application tape 50' includes two or more tabs 55a' and 55b', including embodiments where the tabs 55a' and 55b' protrude from opposite sides (e.g., ends, etc.) of the application tape 50', the tabs 55a' and 55b' may enable a consumer to handle the application tape 50' in a manner that facilitates alignment of the protective film 30' with a surface 110' of a substrate 100' to which the protective film 30' is to be applied.

In FIGS. 25-28, another embodiment of a dry apply protective system 10" is depicted. For the sake of simplicity, the dry apply protective system 10" may also be referred to as a "system 10"." As shown, the system 10" includes a protective film 30", a backing 20", an application tape 50", and, optionally, a release layer 40 (FIG. 5A). The characteristics, manufacture, and assembly of the system 10" and its various elements may, in some embodiments, be similar to those of the other embodiments of dry apply systems disclosed herein, and their variations.

The protective film 30" may be configured with a shape and dimensions that are substantially the same as, or slightly smaller than, the corresponding shape and dimensions of a surface over which the protective film 30" is configured to be positioned. In the depicted embodiment, the protective film 30" is configured to be positioned over the display of the tablet computer marketed by Apple, Inc., of Cupertino, Calif., as THE NEW IPAD®. Of course, protective films 30" with other configurations (e.g., for placement over other surfaces of THE NEW IPAD®, over surfaces of other portable electronic devices, over surfaces of other devices, of other substrates, etc.) are also within the scope of this disclosure.

The protective film 30" may comprise any suitable material. It may be flexible. It may be transparent. In a specific embodiment, the protective film 30" comprises polyurethane film. In some embodiments, the protective film 30" may be about 4 mils (0.004 in.) to about 12 mils (0.012 in.) thick.

Since it is a film, the protective film 30" includes two surfaces that face in opposite directions: an adherent surface 34" and an exterior surface 32". The adherent surface 34" is configured to be positioned against and secured to (e.g., with an adhesive material, etc.) a surface of a substrate (e.g., a device, etc.) that is to be protected. Since the exterior surface 32" faces away from the adherent surface 34", the exterior surface 32" is also configured to face away from the surface that is to be protected.

The protective film 30" may carry and, for purposes of this disclosure, be said to comprise an adhesive material 36". Among a variety of different adhesive materials that may be used, the adhesive material 36" may comprise a so-called "pressure-sensitive" adhesive material 36". The pressure-sensitive adhesive material 36" may be configured to semi-permanently secure the adherent surface 34" of the protective film 30" to a surface to be protected, but be selectively removed from the surface (e.g., when repositioning the protective film 30" relative to the surface, when removing a damaged protective film from the surface, etc.). In addition, a pressure-sensitive adhesive material 36" may leave little or no residue on the previously protected surface once the protective film 30" has been removed from, and no longer protects, that surface.

In some embodiments, the adherent surface 34" and/or any adhesive material 36" thereon may include microchannels. In a specific embodiment, the microchannels may impart the adherent surface 34" and/or any adhesive material 36" thereon with a repetitive hexagonal pattern. The microchannels may enable air to be removed from between the adherent surface 34" and a surface to which the protective film 30" is secured, while the protective film 30" is secured to that surface and/or after the protective film 30" has been secured to that surface.

The backing 20" may be removably secured to the adherent surface 34" of the protective film 30", or to any adhesive material 36" on the adherent surface 34", to prevent contamination of the adherent surface 34" or any adhesive material 36" on the adherent surface 34". The backing 20" may be rigid in comparison to the protective film 30", yet still slightly flexible. The backing 20" may also be transparent, substantially transparent, or translucent enough to identify various features of a surface to be protected. A variety of materials, including, but not limited to, a biaxially-oriented polyethylene terephthalate (BoPET) or a stretched polyester film (e.g., that marketed by du Pont de Nemours & Co. under the MYLAR® trademark, etc.), may possess these characteristics and, thus, be used for the backing 20". Without limiting the scope of the disclosed subject matter, the backing 20" may, in some embodiments, have a thickness of about 5 mils (0.005 in.) to about 10 mils (0.010 in.).

One or more characteristics of the backing 20" may facilitate its removal from the application tape 50" more readily than the application tape 50" is removed from the protective film 30". Some non-limiting examples of such characteristics include the rigidity of the backing 20", a material of the backing (or a coating thereof) that interfaces with the adhesive material 56" on the adherent surface 52" of the application tape 50", and an area of the backing 20" adhered to the application tape 50".

As shown in FIG. 28, some embodiments of the backing 20" may be segmented. As illustrated, the backing 20" may include two or more discrete sections, including a relatively small alignment section 22" and a larger adhesion section 24". The alignment section 22" is referred to as such because its removal from the adherent surface 34" of the protective film 30" exposes enough of the adherent surface 34" to enable the protective film 30" to be aligned with and secured in place relative to a surface to be protected, while the majority of the adherent surface 34" remains covered and, thus, protected by the adhesion section 24" of the backing 20". As the adhesion section 24" is removed from the adherent surface 34", the adherent surface 34" is secured in place over, or secured to, the surface to be protected.

In addition to being configured to cover the adherent surface 34" of the protective film 30", one or more portions 20p" of the backing 20" may be configured to extend laterally beyond an outer periphery 31" of the protective film 30". These portions 20p" may be configured to be superimposed with corresponding portions 50p" of the application tape 50".

With returned reference to FIGS. 25 through 28, collectively, the application tape 50" may be superimposed with and removably secured in place to the exterior surface 32" of the protective film 30". Portions 50p" of the application tape 50" that extend laterally beyond the outer periphery 31" of the protective film 30" may be superimposed with and removably secured to corresponding portions 20p" of the backing 20".

As best illustrated by FIG. 27, an adherent surface 54", or adhesive-bearing surface, of the application tape 50" may carry an adhesive material 56" (e.g., a pressure-sensitive adhesive material, etc.), which removably secures the application tape 50" to the protective film 30" and the backing 20". The adhesive material 56" of the application tape 50" may have lower tack and, thus, be less adhesive, than the adhesive material 36" of the protective film 30". An opposite, exterior surface 52" of the application tape 50" faces away from the protective film 30" and the backing 20".

The exterior surface 52" of the application tape 50" may be configured to receive a pressure front 60" (FIGS. 29 through 33), such as that applied by a securing element 62" (FIGS. 29 through 33). Upon application of a pressure front 60" to the exterior surface 52" of the application tape 50", the application tape 50" may translate the pressure front 60" to the adjacent protective film 30" and, in some embodiments, prevent damage to the protective film 30" as the pressure front 60" is indirectly applied thereto. In various embodiments, the application tape 50" may be relatively flexible.

In addition, a configuration of the exterior surface 52" of the application tape 50" may minimize friction as a securing element 62" is translated across the exterior surface 52". In a specific embodiment, the exterior surface 52" may be textured in a manner that enables the smooth, continuous translation of a securing element 62" thereacross while the securing element 62" is used to apply a significant enough pressure front 60" to secure the protective film 30" to a surface that is to be protected.

In some embodiments, the application tape 50" may carry indicia 58", 59". The indicia 58", 59" may be carried by the exterior surface 52", by the adherent surface 52", internally (e.g., between sublayers of the application tape 50", etc.), or in any combination of the foregoing. At least some of the indicia 58" may comprise alignment features, which facilitate alignment of the protective film 30" with a surface of a substrate to which the protective film 30" is to be applied. Some of the indicia 59" may comprise instructions, which may be viewed by an individual as he or she installs the protective film 30" on a surface to be protected. An application tape 50" may also carry both alignment features (indicia 58") and instructions (indicia 59"); for example, in the manner illustrated by FIGS. 25 and 26.

As illustrated by FIG. 29, the protective film 30" of a system 10", as well as one or both of a backing 20" and an application tape 50" of the system 10", may include a number of cutout features. Some of these cutout features may extend through an interior portion of the protective film 30", the backing 20" and/or the application tape 50", while other cutout features may comprise cutouts in the periphery 31" of the protective film 30" and/or the peripheries 21" and 51" of one or both of the backing 20" and the application tape 50", respectively.

With reference to FIGS. 29 through 33, an embodiment of a technique for protecting the surface 110" of a substrate 100" is described.

In various embodiments, such a method may include removing the alignment portion 22" of a backing 20" from an adherent surface 34" of a protective film 30" and aligning the protective film 30" with a surface 110" to be protected, as shown in FIG. 33. Removal of the alignment portion 22" of the backing 20" from the adherent surface 34" of the protective film 30" may comprise peeling the alignment portion 22" of the backing 20" from the adherent surface 34" of the protective film 30". In embodiments where the backing 20" is relatively rigid, the alignment portion 22" may be removed by bending the protective film 30" away from the backing 20" at or near a boundary between the alignment portion 22" and the adhesion section 24" of the backing 20", which may cause the alignment portion 22" to separate from the adherent surface 34" of the protective film 30". An individual may then grasp the section of the alignment portion 22" that has separated from the adherent surface 34" of the protective film 30", and peel the remainder of the alignment portion 22" of the backing 20" from the adherent surface 34" of the protective film 30". This action exposes a relatively small area 34A" of the adherent surface 34", which, in some embodiments, may comprise a thin (e.g., an inch or less, three quarters of an inch or less, half an inch or less, a quarter of an inch or less, etc.), elongate strip at an edge of the protective film 30". At this point, the adhesion section 24" of the backing 20" may continue to cover a majority 34B" of the adherent surface 34".

As illustrated by FIG. 30, with the area 32A" of the adherent surface 34" of the protective film 30" exposed, the protective film 30" may be aligned with the surface 110" of the substrate 100". Alignment of the protective film 30" with the surface 110" may be facilitated by indicia 58", 59" on an application tape 50" carried by an exterior surface 32" of the protective film 30" and/or by various features 38" (e.g., cutouts, etc.) formed through the protective film 30" or at its outer periphery 31".

With the protective film 30" held in alignment with the surface 110" of the substrate 100", or at least while attempting to maintain alignment of the protective film 30" and the surface 110", the protective film 30" may be partially secured to a portion of the surface 110". More specifically, adhesive material on a relatively small exposed area 34A" of the adherent surface 34" may secure the protective film 30" to the surface 110". If necessary or desired, the protective film 30" may be removed from, repositioned over and re-secured to the surface 110". In the illustrated embodiment, where the exposed area 34A" comprises a thin strip, the exposed area 34A" may be further secured to the surface 110" manually (e.g., with a finger, thumb, securing element 62" (FIGS. 31 and 32), etc.). A pressure front 60" (FIGS. 31 and 32) may then be applied over an area 30A" of the protective film 30" that has been secured to the surface 110" and drawn across the area 30A" to further secure the protective film 30" to the surface 110" and, optionally, to remove air bubbles from between the protective film 30" and the surface 110". In embodiments where an application tape 50" covers an exterior surface 32" of the protective film 30", the pressure front 60" may be applied to and translated across an exterior surface 52" of the application tape 50", which may be configured to facilitate translation of the pressure front 60" in a smooth, continuous fashion, as well as to prevent damage to the exterior surface 32" of the protective film 30" as it is applied and secured to the surface 110" of the substrate 100".

Thereafter, as depicted by FIG. 31, once area 30A" of the protective film 30" has been secured to the surface 110" of the substrate 100", the remainder 30B" of the protective film 30" may be lifted away from the surface 110". At this point, the adhesion section 24" of the backing 20" still covers part 22B" of the adherent surface 34" of the remainder 30B" of the protective film 30". With the remainder 30B" of the protective film 30" lifted away from the surface 110" of the substrate 100", a pressure front 60" may be applied to the adhered area 30A" of the protective film 30", and translated toward the remainder 30B" of the protective film 30".

As the pressure front 60" moves onto the remainder 30B" of the protective film 30", it causes the adhesion section 24" of the backing 20" to gradually separate from the remainder 30B" of the protective film 30". A leading edge of the adhesion section 24" of the backing 20" may be oriented away from, or in front of, the pressure front 60" and move with the pressure front 60". Once the leading edge of the adhesion section 24" starts to extend away from the pressure front 60", due to its rigidity, the backing 20" may hold the unsecured portion of the remainder 30B" of the protective film 30" away from the surface 110", or orient the protective film 30" at a nonparallel angle to the surface 110". Thus, the unsecured portion of the remainder 30B" of the protective film 30" may be released, and translation of the pressure front 60" may continue without anything other than the adhesion section 24" of the backing 30" holding the unsecured portion of the remainder 30B" of the protective film 30" away from the surface 110" to be protected. In addition, the rigidity of the backing 20" may enable its adhesion section 24" to separate from the adherent surface 34" of the protective film 30" without needing to be pulled or peeled from the protective film 30". The adhesion section 24" of the backing 20" may remain somewhat flat (e.g., includes a slight bend over the pressure front 60", is bent at an obtuse angle, etc.), particularly when compared with the protective film 30", which may be concurrently bent at an acute angle. As the pressure front 60" is translated over the remainder 30B" of the protective film 30", the protective film 30" is gradually exposed and simultaneously or immediately thereafter secured to the surface 110" of the substrate 100", as illustrated by FIG. 32.

When the entire protective film 30" has been secured to the surface 110" of the substrate 100", the adhesion section 24" of the backing 20" may fall away from the protective film 30". Thereafter, any air bubbles that may have been trapped between the protective film 30" and the protected surface 110" of the substrate 100" may be removed (e.g., by generation and translation of additional pressure fronts, etc.).

In embodiments where an application tape 50" covers an exterior surface 32" of the protective film 30", once the protective film 30" has been secured to the surface 110" of the substrate 100", the application tape 50" may removed from (e.g., peeled away from, etc.) the exterior surface 32" of the protective film 30". In embodiments where the adhesive material 56" (FIG. 27) of the application tape 50" has lower tack than the adhesive material 36" (FIG. 27) of the protective film 30", the application tape 50" may be removed from the exterior surface 32" of the protective film 30" without pulling the adherent surface 34" of the protective film 30" from the surface 110".

The construction of a system 10, 10', 10" that incorporates teachings of this disclosure, as well as methods by which the protective film 30, 30', 30" of such a system 10, 10', 10" may be applied to a surface 110" of a substrate 100", enable the use of dry apply techniques to provide transparent protection over the high resolution displays of a variety of electronic devices, including the relatively large displays of tablet and laptop computers.

Although the foregoing description contains many specifics, these should not be construed as limiting the scope of any of the appended claims, but merely as providing information pertinent to some specific embodiments that may fall within the scopes of the appended claims. Features from different embodiments may be employed in combination. In addition, other embodiments may also be devised which lie within the scopes of the appended claims. The scope of each claim is indicated and limited only by its terms and the legal equivalents to the elements thereof. All additions, deletions, and modifications to the disclosed subject matter that fall within the meanings and scopes of the claims are to be embraced by the claims.

What is claimed:

1. A method for protecting a surface of a substrate, comprising:
   grasping a protruding feature of a backing of a system for protecting a surface of a substrate;
   grasping a protruding feature of an application tape of the system for protecting a surface of a substrate;
   separating the protruding feature of the backing from the protruding feature of the application tape; and
   peeling the backing from a protective film of the system for protecting a surface of a substrate to expose an adhesive on an adherent surface of the protective film.

2. The method of claim 1, wherein grasping the protruding feature of the backing of the system for protecting a surface of a substrate comprises grasping a protruding feature of the backing located adjacent to a first peripheral edge of the system for protecting a surface of a substrate.

3. The method of claim 2, wherein grasping the protruding feature of the application tape of the system for protecting a surface of a substrate comprises grasping a first protruding feature of the application tape located adjacent to the first peripheral edge of the system for protecting a surface of a substrate and superimposed with the protruding feature of the backing.

4. The method of claim 1, wherein peeling the backing from the protective film of the system for protecting a surface of a substrate comprises pulling the protruding feature of the backing over and away from at least a portion of the protective film to expose the adhesive on the adherent surface of the protective film.

5. The method of claim 1, wherein:
   peeling the backing comprises peeling a portion of the backing from the protective film continuous with the protruding feature of the backing to expose a strip of the adhesive on the adherent surface of the protective film adjacent to a first peripheral edge of the protective film without removing a remainder of the backing from a remainder of the adhesive on the adherent surface of the protective film.

6. The method of claim 5, further comprising:
   securing the strip of the adhesive on the adherent surface of the protective film to the surface of the substrate.

7. The method of claim 6, further comprising:
   peeling the remainder of the backing away from a remainder of the adherent surface of the protective film; and securing the remainder of the adherent surface of the protective film to the surface of the substrate with the adhesive on the remainder of the adherent surface.

8. The method of claim 7, wherein peeling the remainder of the backing away from the remainder of the adherent surface of the protective film and securing the remainder of the adherent surface of the protective film to the surface of the substrate with the adhesive comprise:
lifting an unsecured portion of the protective film away from the surface of the substrate;
applying a pressure front to a secured portion of the protective film that has been adhesively secured to the surface of the substrate;
translating the pressure front from the secured portion to the unsecured portion of the protective film;
releasing the protective film, the remainder of the backing holding the unsecured portion of the protective film away from the surface of the substrate; and
further translating the pressure front across the protective film to concurrently gradually release the another section of the backing from the unsecured portion of the protective film and gradually secure the unsecured portion of the protective film to the surface of the substrate.

9. The method of claim 8, wherein:
translating the pressure front from the secured portion to the unsecured portion of the protective film comprises separating a portion of the remainder of the backing located adjacent to the strip of the adhesive from adhesive on a remainder of the adherent surface of the protective film;
releasing the protective film comprises positioning an edge of the portion of the remainder of the backing against the surface of the substrate, with the remainder of the backing holding the unsecured portion of the protective film in an at least partially upright orientation; and
an unsecured portion of the protective film remains in an at least partially upright orientation while further translating the pressure front across the protective film.

10. The method of claim 8, wherein applying the pressure front, translating the pressure front and further translating the pressure front respectively comprise applying the pressure front, translating the pressure front and further translating the pressure front through the application tape on the exterior surface of the protective film.

11. The method of claim 1, further comprising:
aligning the protective film with the surface of the substrate before securing the adherent surface of the protective film to the surface of the substrate.

12. The method of claim 11, wherein aligning includes viewing the surface of the substrate through the protective film and through the backing.

13. The method of claim 11, wherein aligning the protective film with the surface of the substrate comprises grasping protruding features extending from opposite ends of the application tape and positioning the application tape and the protective film over the surface of the substrate.

14. The method of claim 1, further comprising:
securing the adherent surface of the protective film to a surface of a substrate with the adhesive.

15. The method of claim 1, wherein grasping the protruding feature of the application tape comprises grasping a first protruding feature of the application tape at a first peripheral edge of the system for protecting a surface of a substrate.

16. The method of claim 15, further comprising:
grasping a second protruding feature of the application tape at a second peripheral edge of the system for protecting a surface of a substrate.

17. The method of claim 16, wherein grasping the second protruding feature of the application tape at the second peripheral edge of the system for protecting a surface of a substrate comprises grasping a protruding feature of the application tape at a second peripheral edge of the system, opposite from the first peripheral edge of the system.

18. The method of claim 16, further comprising:
pulling the second protruding feature to peel the application tape from an outer surface of the protective film.

19. A method for protecting a surface of a substrate, comprising:
grasping a first protruding feature of a backing of a system for protecting a surface of a substrate;
grasping a first protruding feature of an application tape of the system for protecting a surface of a substrate; and
peeling the backing from a protective film of the system for protecting a surface of a substrate by pulling the first protruding feature of the backing away from the first protruding feature of the application tape to expose an adhesive on an adherent surface of the protective film.

20. The method of claim 19, wherein grasping the first protruding feature of the backing of the system for protecting a surface of a substrate comprises grasping the first protruding feature of the backing located adjacent to a first peripheral edge of the system for protecting a surface of a substrate.

21. The method of claim 20, wherein grasping the first protruding feature of the application tape of the system for protecting a surface of a substrate comprises grasping the first protruding feature of the application tape located adjacent to the first peripheral edge of the system for protruding a surface of a substrate and superimposed with the first protruding feature of the backing.

22. The method of claim 19, wherein peeling the backing from the protective film of the system for protecting a surface of a substrate comprises pulling the first protruding feature of the backing over and away from at least a portion of the protective film to expose the adhesive on the adherent surface of the protective film.

23. The method of claim 19, wherein:
peeling the backing from the protective film comprises removing a section of the backing from a portion of the adherent surface of the protective film to expose the portion of the adherent surface.

24. The method of claim 23, further comprising:
securing the adherent surface of the protective film to the surface of the substrate with the adhesive comprises securing the portion of the adherent surface to the surface of the substrate.

25. The method of claim 23, further comprising:
peeling another section of the backing away from another portion of the adherent surface of the protective film.

26. The method of claim 25, further comprising:
securing the another portion of the adherent surface of the protective film to the surface of the substrate with the adhesive.

27. The method of claim 26, wherein peeling the another section of the backing away from the another portion of the adherent surface of the protective film and securing the another portion of the adherent surface of the protective film to the surface of the substrate with the adhesive comprise:
lifting an unsecured portion of the protective film away from the surface of the substrate;

applying a pressure front to a secured portion of the protective film that has been adhesively secured to the surface of the substrate;
translating the pressure front from the secured portion to the unsecured portion of the protective film;
releasing the protective film, another section of the backing holding the unsecured portion of the protective film away from the surface of the substrate; and
further translating the pressure front across the protective film to concurrently gradually release the another section of the backing from the unsecured portion of the protective film and gradually secure the unsecured portion of the protective film to the surface of the substrate.

28. The method of claim 27, wherein:
translating the pressure front from the secured portion to the unsecured portion of the protective film comprises separating a portion of a remainder of the backing located adjacent to the adhesive from the adhesive on a remainder of the adherent surface of the protective film;
releasing the protective film comprises positioning an edge of the portion of the remainder of the backing against the surface of the substrate, with the remainder of the backing holding the unsecured portion of the protective film in an at least partially upright orientation; and
an unsecured portion of the protective film remains in an at least partially upright orientation while further translating the pressure front across the protective film.

29. The method of claim 27, wherein applying the pressure front, translating the pressure front and further translating the pressure front respectively comprise applying the pressure front, translating the pressure front and further translating the pressure front through the application film on the exterior surface of the protective film.

30. The method of claim 19, further comprising:
aligning the protective film with the surface of the substrate.

31. The method of claim 30, wherein aligning the protective film with the surface of the substrate includes:
holding the first protruding feature of the application tape on an exterior surface of the protective film;
holding a second protruding feature of the application tape located adjacent to a second peripheral edge of the system, opposite from the first peripheral edge; and
while holding the first protruding feature of the application tape and holding the second protruding feature, positioning the protective film over the surface of the substrate.

32. The method of claim 30, wherein aligning includes viewing the surface of the substrate through the protective film and through the backing.

33. The method of claim 19, further comprising:
securing the adherent surface of the protective film to a surface of a substrate with the adhesive.

34. The method of claim 33, further comprising:
grasping a second protruding feature of the application tape located adjacent to a second peripheral edge of the system; and
peeling the application tape from an exterior surface of the protective film by pulling on the second protruding feature.

35. A method for protecting a surface of a substrate, comprising:
pulling a first tab protruding from a backing of a system for protecting a surface of a substrate away from a first tab protruding from an application tape of the system to expose an adhesive on an adherent surface of a protective film located between the backing and the application tape.

36. The method of claim 35, wherein pulling the first tab includes removing a first portion of the backing from the adherent surface of a first portion of the protective film and from a first peripheral portion of the application tape that extends beyond and around an outer periphery of the first portion of the protective film.

37. The method of claim 36, wherein positioning comprises positioning the first portion of the protective film against a first portion of the surface of the substrate.

38. The method of claim 35, further comprising:
aligning the protective film with the surface of the substrate while holding the first tab protruding from a first edge of the application tape and a second tab protruding from a second edge of the application tape, the first edge and the second edge being on opposite ends of the application tape.

39. The method of claim 38, wherein aligning further comprises visualizing the surface of the substrate through the protective film and the application tape.

40. The method of claim 38, wherein aligning further comprises visualizing the surface of the substrate through a portion of the backing remaining on the adherent surface of the protective film.

41. The method of claim 35, further comprising:
positioning the adhesive against the surface of the substrate to secure at least a portion of the protective film to the surface from a first end of the protective film located adjacent to a first edge of the application tape to a second end of the protective film located adjacent to a second edge of the application tape.

42. The method of claim 41, further comprising:
removing the application tape from the second edge of the application tape to the first edge of the application tape by pulling on the second tab protruding from the second edge of the application tape.

* * * * *